(12) United States Patent
Williams et al.

(10) Patent No.: US 7,305,164 B2
(45) Date of Patent: Dec. 4, 2007

(54) ENHANCED OPTICAL WAVEGUIDE

(75) Inventors: David Philip Williams, Bath (GB);
Brian Joseph Mangan, Bath (GB);
Philip St. John Russell, Bath (GB)

(73) Assignee: Crystal Fibre A/S, Birkerod (DK)

( * ) Notice: Subject to any disclaimer, the term of this patent is extended or adjusted under 35 U.S.C. 154(b) by 293 days.

(21) Appl. No.: 10/539,206

(22) PCT Filed: Dec. 22, 2003

(86) PCT No.: PCT/GB03/05673

§ 371 (c)(1),
(2), (4) Date: Jun. 17, 2005

(87) PCT Pub. No.: WO2004/057394

PCT Pub. Date: Jul. 8, 2004

(65) Prior Publication Data

US 2006/0088260 A1 Apr. 27, 2006

(30) Foreign Application Priority Data

| Dec. 20, 2002 | (GB) | .................... 0229826.3 |
| Feb. 5, 2003 | (GB) | .................... 0302632.5 |
| Mar. 21, 2003 | (GB) | .................... 0306593.5 |
| Mar. 21, 2003 | (GB) | .................... 0306606.5 |
| Jun. 20, 2003 | (GB) | .................... 0314485.4 |

(51) Int. Cl.
*G02B 6/02* (2006.01)
*G02B 6/028* (2006.01)
*G02B 6/032* (2006.01)
*G02B 6/036* (2006.01)

(52) U.S. Cl. ............... 385/123; 385/124; 385/125; 385/126; 385/127; 385/128

(58) Field of Classification Search ......... 385/123–128
See application file for complete search history.

(56) References Cited

U.S. PATENT DOCUMENTS 6,404,966 B1   6/2002  Kawanishi et al.

(Continued)

FOREIGN PATENT DOCUMENTS

WO         99/64903 A1    12/1999

(Continued)

OTHER PUBLICATIONS

PCT Search Report dated Apr. 22, 2004, for PCT/GB/05673.

(Continued)

*Primary Examiner*—Frank G. Font
*Assistant Examiner*—Jerry Martin Blevins
(74) *Attorney, Agent, or Firm*—Buchanan Ingersoll & Rooney PC

(57) ABSTRACT

Novel preforms and methods of making novel preforms are described. The preforms are suitable for being drawn into photonic bandgap optical fibres. In one form, the preform comprises a stack of elongate members having, in transverse cross section, a triangular close-packed arrangement of circular cross section capillaries, which define interstitial regions containing solid rods. The stack is supported around a relatively large capillary, which defines an inner region of the stack. The stack may be adapted by varying the number of rods in any given interstitial region, in order to generate various different configurations of cladding structure, which can be made into optical fibres having surprising operational characteristics, such as a split gap.

36 Claims, 19 Drawing Sheets

U.S. PATENT DOCUMENTS

| | | |
|---|---|---|
| 6,418,258 B1 | 7/2002 | Wang |
| 2002/0136516 A1 | 9/2002 | Allan et al. |
| 2005/0147370 A1* | 7/2005 | Yusoff et al. ............... 385/125 |
| 2006/0263022 A1* | 11/2006 | Han ........................... 385/123 |

FOREIGN PATENT DOCUMENTS

| | | |
|---|---|---|
| WO | 00/49436 A1 | 8/2000 |
| WO | 00/60388 A1 | 10/2000 |
| WO | 01/88578 A1 | 11/2001 |
| WO | 02/16980 A1 | 2/2002 |
| WO | 02/16983 A1 | 2/2002 |
| WO | 02/41050 A2 | 5/2002 |
| WO | 02/072489 A2 | 9/2002 |
| WO | 02/075392 A2 | 9/2002 |
| WO | 02/084347 A2 | 10/2002 |
| WO | 02/088801 A2 | 11/2002 |
| WO | 2004/057391 A1 | 7/2004 |
| WO | 2004/057393 A1 | 7/2004 |

OTHER PUBLICATIONS

Great Britain Search Report dated Feb. 19, 2003 for GB 0229826.3.
Great Britain Search Report dated Apr. 8, 2003 for GB 0302632.5.
Great Britain Search Report dated Jul. 28, 2003 for GB 0306593.5.
Great Britain Search Report dated Apr. 10, 2003 for GB 0306606.5.
Great Britain Search Report dated Jan. 28, 2004 for GB 0314485.4.
Birks et al., Full 2-D Photonic Bandgaps in Silica/Air Structures, Electronics Letters, Oct. 26, 1995, pp. 1941-1942, vol. 31, No. 22.
Allan et al., "Photonic Crystal Fibers: Effective-Index and Band-Gap Guidance" from the book "Photonic Crystal and Light Localization in the 21$^{st}$ Century", C.M. Soukoulis (ed.), © 2001 Kluwer Academic Publishers, pp. 305-320, Netherlands.
Venkataraman et al., "Low Loss (13dB/km) Air Core Photonic Band-Gap Fibre", Post-deadline session 1 :PD1.1 2002.
Litchinitser et al., "Antiresonant Reflecting Photonic Crystal Optical Waveguides", Optics Letters, Sep. 15, 2002, pp. 1592-1594.

* cited by examiner

ENHANCED OPTICAL WAVEGUIDE

This disclosure is based upon British Application No. 0229826.3, filed Dec. 20, 2002, British Application No. 0302632.5, filed Feb. 5, 2003, British Application No. 0306593.5, filed Mar. 21, 2003, British Application No. 0306606.5, filed Mar. 21, 2003, British Application No. 0314485.4, filed Jun. 20, 2003, and International Application No. PCT/GB2003/005673, filed Dec. 22, 2003, the contents of which are incorporated herein by reference.

The present invention is in the field of optical waveguides and relates in particular to optical waveguides that guide light by virtue of a pliotonic bandgap.

Optical fibre waveguides, which are able to guide light by virtue of a so-called photonic bandgap (PBG), were first considered in 1995.

In, for example, "Full 2-D photonic bandgaps in silica/air structures", Birks et al., Electronics Letters, 26 Oct. 1995, Vol. 31, No. 22, pp. 1941-1942, it was proposed that a PBG may be created in an optical fibre by providing a dielectric cladding structure, which has a refractive index that varies in two dimensions periodically between high and low index regions, and a core defect in the cladding structure in the form of a hollow core. In the proposed cladding structure, periodicity was provided by an array of air holes that extended through a silica glass matrix material to provide a PBG structure through which certain wavelengths and propagation constants of light could not pass. It was proposed that light coupled into the hollow core defect would be unable to escape into the cladding due to the PBG and, thus, the light would remain localised in the core defect.

It was appreciated that light travelling through a hollow core defect, for example filled with air or even under vacuum, would suffer significantly less from undesirable effects, such as non-linearity and loss, compared with light travelling through a solid silica or doped silica fibre core. As such, it was appreciated that a PBG fibre may find application as a transmission fibre to transmit light between a transmitter and a receiver over extremely long distances, for example under the Atlantic Ocean, without undergoing signal regeneration, or as a high optical power delivery waveguide. In contrast, for standard index-guiding, single mode optical fibre, signal regeneration is typically required approximately every 80 kilometres.

PBG fibre structures are typically fabricated by first forming a pre-form and then heating and drawing an optical fibre from that pre-form in a fibre-drawing tower. It is known either to form a pre-form by stacking capillaries and fusing the capillaries into the appropriate configuration of pre-form, or to use extrusion.

The first hollow core PBG fibres that were attempted by the inventors had a periodic cladding structure formed by a triangular array of circular air holes embedded in a solid silica matrix and surrounding a central air core defect. Such fibres were formed by stacking circular or hexagonal capillary tubes, incorporating a core defect into the cladding by omitting a single, central capillary of the stack, and then heating and drawing the stack, in a one or two step process, to form a fibre having the required structure.

International patent application WO00/60388 (The Secretary of State for Defence, UK), filed on 31 Mar. 2000, proposed the first PBG fibre to have a so-called seven-cell core defect, surrounded by a cladding comprising a triangular array of air holes embedded in an all-silica matrix. The core defect 4 was formed by omitting an inner capillary and, in addition, the six capillaries surrounding the inner capillary of a preform stack 5, as illustrated in FIGS. 1a and 1b herein. Capillaries 1 around the core defect boundary in the stack 5 were supported during formation of the pre-form by inserting at either end of the stack truncated capillaries 6, which did not meet in the middle of the stack 5. The stack 5 was then heated in order to fuse the capillaries together into a pre-form suitable for drawing into an optical fibre. Clearly, only the fibre drawn from the central portion 7 of the stack, with the missing inner seven capillaries, was suitable for use as a hollow core defect fibre. As shown in the image in FIG. 2 herein, the resulting fibre had a cladding comprising an array of larger elongate holes, corresponding to the capillary holes 2, and smaller, elongate interstitial holes, corresponding to the natural gaps 3 that formed between the non-tessellating, circular capillaries. By "tessellating" herein, we refer to elongate elements, having identically-shaped cross sections, that bundle together without creating elongate interstitial gaps. Exemplary elongate elements that would tessellate would be those having equilateral triangular, square or hexagonal cross sections.

Published international patent application WO00/49436 (The University of Bath, UK), filed on 18 Feb. 2000, describes a process for avoiding the formation of PBG fibres having interstitial voids, of the kind described in relation to WO00/60388, by evacuating the respective voids in the stack prior to drawing a fibre from the stack.

In the chapter entitled "Photonic Crystal Fibers: Effective Index and Band-Gap Guidance" from the book "Photonic Crystal and Light Localization in the $21^{st}$ Century", C. M. Soukoulis (ed.), ©2001 Kluwer Academic Publishers, the authors presented further analysis of PBG fibres based primarily on a seven-cell core defect fibre 300 having a triangular array of air holes 305 in the cladding, as illustrated in FIG. 3 herein. The optical fibre 300 was fabricated from a preform, which was formed by stacking and drawing hexagonal cross section capillary tubes 405, which tessellate and avoid the formation of interstitial voids. An exemplary preform stack 400 suitable for forming this kind of fibre is shown in FIG. 4 herein. With reference to FIG. 4, the preform comprises a stack of hexagonal capillaries 405 around a core region 425, defined by seven missing capillaries. The hexagonal capillaries each have a circular bore. As can be seen, the material in the preform is more concentrated where corners 415 of the capillaries meet than where edges of the capillaries meet. As can be seen in FIG. 3, the fibre has a core region 310 and a cladding region 320 that correspond to the respective regions of the preform. In particular, the cladding has "nodes" 360 that correspond to regions where the corners of the capillaries met in the preform, and relatively thinner "veins" 375 that correspond to regions where the edges of the capillaries met in the preform. There is also a core boundary region 345, at the interface between the core and cladding regions, comprising twelve boundary veins 370 between neighbouring boundary nodes 355. Alternate veins around the core defect have a bead 350, or nodule, at an intermediate point between the respective nodes. The beads 350 are formed from the glass of the six inwardly-facing corners 420 of the capillaries around the core region of the pre-form. These corners 420, and the two sides of each respective capillary that meet at the corners, recede due to surface tension as the stack of capillaries is heated and drawn into fibre, to produce the apparent single veins 340 with intermediate beads 350, as shown. The effect of this is that holes 335 formed from these capillaries naturally adopt a generally pentagonal form, whereas the other boundary holes 325 (resulting from capillaries in the stack having inwardly-facing edges rather than corners) and cladding holes 305 of the resulting PBG fibre are typically of generally hexagonal form.

Published international patent application WO 99/64903 describes various ways of making preform stacks using combinations of solid rods and capillaries to form intricate fibre cladding structures comprising plural different hole sizes and shapes, with the aim of increasing the bandwidth of the respective bandgaps.

The more recent prior art publications relating to PBG fibres have determined that, for silica and air fibres at least, high fractions by volume of air in the cladding (known herein as air filling fraction, or simply "AFF") are preferred in order to obtain high bandwidth bandgaps. AFF up to and above 0.9 have been reported. Herein, AFF, or any equivalent measure (for air, vacuum or other relatively low refractive index regions), is intended to mean the fraction by volume of air in a microstructured, or holey, portion of the cladding, which is representative of a substantially perfect and unbounded cladding. That is, imperfect regions of the cladding, for example near to or abutting a core defect and at an outer periphery of a microstructured region, would not be used in calculating the AFF. Likewise, a calculation of AFF does not take into account over-cladding or jacketing layers, which may surround the microstructured region.

In addition, it has been found that triangular arrays of air holes have produced the lowest loss fibres (see, for example, the post-deadline paper presented at ECOC 2002, "Low Loss (13 dB) Air core defect Photonic Bandgap Fibre", N. Venkataraman et al., which reported a PBG fibre having a seven-cell core defect that exhibited loss as low as 13 dB/km at 1500 nm over a fibre length of one hundred metres. The structure of this fibre has the same general form as the structure considered in the aforementioned book chapter.

According to a first aspect, the present invention provides a preform for a photonic band-gap optical fibre waveguide, comprising a stack of parallel, elongate primary elements and elongate secondary elements in which, in the transverse cross section, the primary elements have a largest external dimension and groups of primary elements define interstitial regions, in at least some of which there is or are respectively one or more secondary elements having a largest external dimension which is less than one third of the size of each of the largest external dimensions of the surrounding primary elements.

Of course, a preform according to the invention may comprise, in transverse cross section, an inner region, for example a core region, a microstructured region, formed by the primary and secondary elongate elements, and, in some embodiments, an outer, jacket region. Generally, unless the contrary case is stated or it is implicit from the description, recited characteristics of the microstructured region typically relate to a portion (or portions) thereof that are not adapted to fit with or match, or are not perturbed in some way by the presence of, an inner or outer region. In other cases, however, particular features of the invention do relate to portions of the microstructured region that are adapted to fit with or match respective inner or outer regions.

The use of secondary elements according to embodiments of the present invention can enable a PBG fibre maker to modify and tune individual node sizes in a respective PBG fibre cladding. This may prove advantageous in many applications, where the characteristics of a PBG need to be carefully controlled.

In some embodiments, the secondary elements may have a largest external dimension which is less than ¼, less than ⅕ or even less than ⅙ of the size of each of the largest external dimensions of the surrounding primary elements.

At least some of the interstitial regions may be defined by groups of fewer than six primary elements. For example, at least some of the interstitial regions may be defined by three primary elements. Indeed, in some embodiments, substantially all of the interstitial regions may be defined by three primary elements.

At least some of the interstitial regions may be enclosed by abutting primary elements. For example, in some embodiments, substantially all of the interstitial regions may be enclosed by abutting primary elements.

Each primary element that defines one interstitial region may abut at least one of the one or more secondary elements that is (or are) in that region. This may apply to some or even at least a majority of the interstitial regions. The respective primary elements that define the region or regions may or may not themselves be abutting. Obviously, where there are plural secondary elements in any given interstitial region, typically, not all of them will abut each primary element. Indeed, some secondary elements may not abut any primary elements.

The primary elements may be non-tessellating in any arrangement thereof. Alternatively, it may be possible in some arrangements to tessellate the primary elements but the elements may, according to some embodiments, be arranged in the preform stack so that they do not tessellate. For example, four primary elements may have a square cross section and be arranged corner to corner around a generally square interstitial region.

At least some of the interstitial regions may contain plural secondary elements. At least some of the interstitial regions may each contain a single secondary element In some embodiments, at least a majority of interstitial regions may each contain a single secondary element.

At least some of the secondary elements may be capillaries. Additionally, or alternatively, at least some of the secondary elements may be rods, for example, all of the secondary elements may be rods. In general, use of capillaries instead of, or in addition to, solid rods permits the PBG fibre maker to select more carefully the volume of glass that is added to an interstitial region: a thinner walled capillary would add less material than a thicker walled capillary or a solid rod having a similar diameter. Hence, individual node sizes in a PBG cladding can be tuned by the fibre maker by careful selection of appropriate combinations of rod and/or capillary dimensions.

Where used, the rods may have a generally circular cross section. Of course, the rods may have other cross sectional shapes, for example triangular, square or hexagonal, and the selected shape may reflect more closely the general cross sectional shape of the interstitial regions.

Further, at least some of the primary elements may be capillaries. In some embodiments, substantially all of the primary elements are capillaries. The capillaries may have various different wall thicknesses, or may share the same wall thickness. As such, hole sizes in a PBG fibre made using such a preform can be tuned by appropriate choice of wall thickness.

Substantially all of the primary elements may have the same cross sectional shape.

At least some of the primary elements may have a circular cross section. In addition, or alternatively, at least some of the primary elements may have a cross sectional shape other than circular, for example triangular, square, hexagonal or octagonal.

Each interstitial region containing one or more secondary elements may contain substantially the same arrangement of one or more secondary elements.

In some embodiments, substantially all interstitial voids contain one or more secondary elements. In other embodiments, the arrangement of interstitial voids may vary in different regions of the preform. For example, there may be interstitial voids in one or more azimuthal quadrants of the preform but not in others. Alternatively, or in addition, there may be interstitial voids in an inner region of the preform but not in an outer region, or visa versa. Or, there may be a radial variation in the arrangement of interstitial voids. Many other arrangements are envisaged.

The primary elements may each have a similar largest external dimension.

At least a portion of the preform may comprise a periodic arrangement of primary and secondary elements having a first characteristic pitch. In addition, the arrangement of primary elements taken in isolation may have a second characteristic pitch. Further, the arrangement of interstitial regions taken in isolation and containing secondary elements may have a third characteristic pitch. Accordingly, the second and third characteristic pitches may be the same or they may be different. For example, the third characteristic pitch may be larger than the second characteristic pitch.

It is highly unlikely in practice that a photonic bandgap structure according to the present invention will comprise a 'perfectly' periodic array, due to imperfections being introduced into the structure during its manufacture and/or perturbations being introduced into the array by virtue of the presence of the core defect and/or additional layers (overcladding) and jacketing around the photonic band-gap structure. The present invention is intended to encompass both perfect and imperfect structures. Likewise, any reference to "periodic", "array", "lattice", or the like herein, imports the likelihood of imperfection.

In some embodiments, the primary elements may form a substantially triangular array. Alternatively, the primary elements may form a substantially hexagonal array. Other configurations, for example square, rectangular or honeycomb arrays, are conceivable. In any case, the primary elements may have a circular cross section or a different shape of cross section.

In transverse cross section, the primary and secondary elongate elements may be arranged around a further parallel elongate element, thereby forming a plurality of second interstitial regions between an outer periphery of the further elongate element and the arrangement of first and second elongate elements. Accordingly, the second interstitial regions may remain empty or at least some of the second interstitial regions may contain one or more secondary elements.

Furthermore, the arrangement of primary and secondary elongate elements may be enclosed, in the transverse cross section, by a large diameter capillary, thereby forming a plurality of third interstitial regions between an inner periphery of the large diameter capillary and the arrangement of primary and secondary elements. At least some of the third interstitial regions may contain one or more secondary elements.

According to a second aspect, the present invention provides an optical fibre made from a preform, which is described hereinbefore and hereinafter as being in accord with the present invention. The fibre may be a photonic band-gap optical fibre.

According to a third aspect, the present invention provides a method of forming a photonic band-gap fibre, comprising the steps of forming a preform of the kind described hereinbefore and hereinafter as being in accord with the present invention, and heating and drawing the preform, in one or more drawing stages, into the aforesaid fibre.

The method may comprise the step of arranging primary elements to form interstitial regions and then inserting, in a longitudinal motion, the secondary elements into the interstitial regions.

Alternatively, the method may comprise the step of placing discrete layers of primary and secondary elements on to one another to form a stack of primary and secondary elements. This step may be achieved manually or in a process comprising using automated equipment to position the primary and secondary elements.

The aforementioned capillaries and rods may comprise an inorganic glass, such as silica. However, embodiments of the present invention are in no way limited to any particular material or combination of materials as long as it or they can be drawn from a preform of the aforementioned kind into a fibre.

Embodiments of the present invention will now be described, by way of example only, with reference to the accompanying drawings, of which:

Figure 6A:
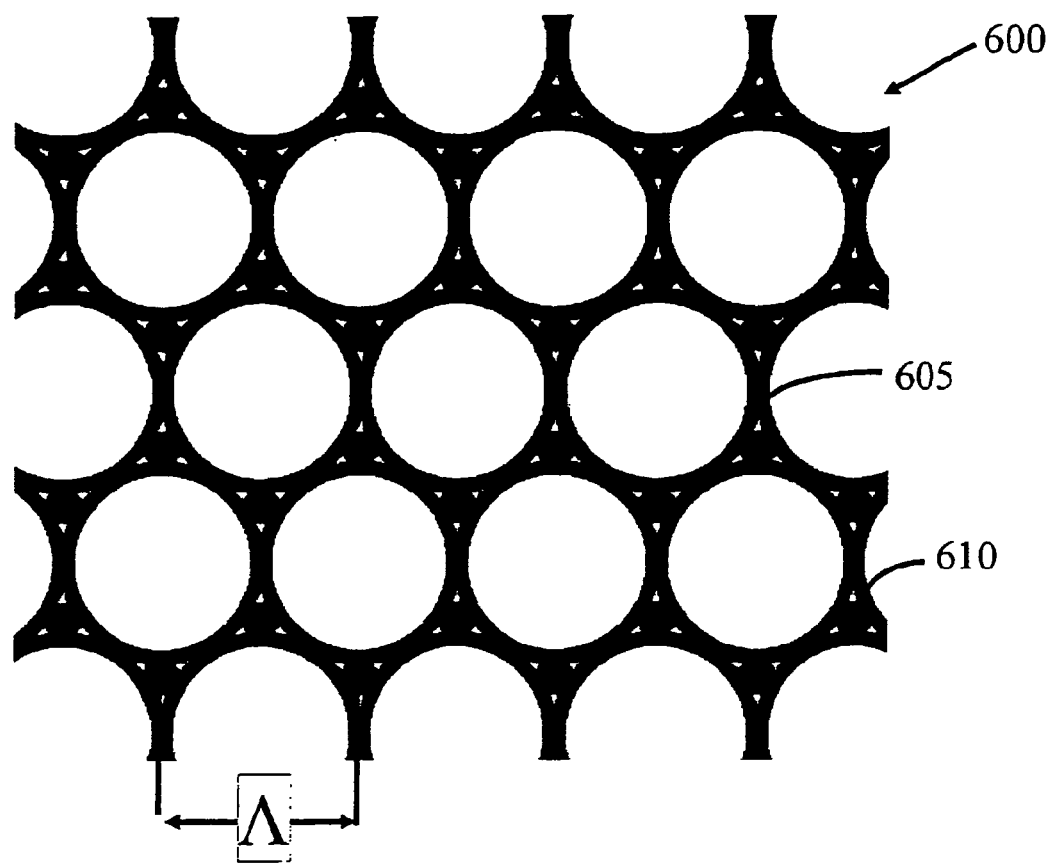
FIG. 6a is a diagram of a portion of a preform stack according to an embodiment of the present invention, in which non-tessellating, circular cross section capillaries are stacked and form interstitial regions, all of which contain solid rods.
Figure 6B:
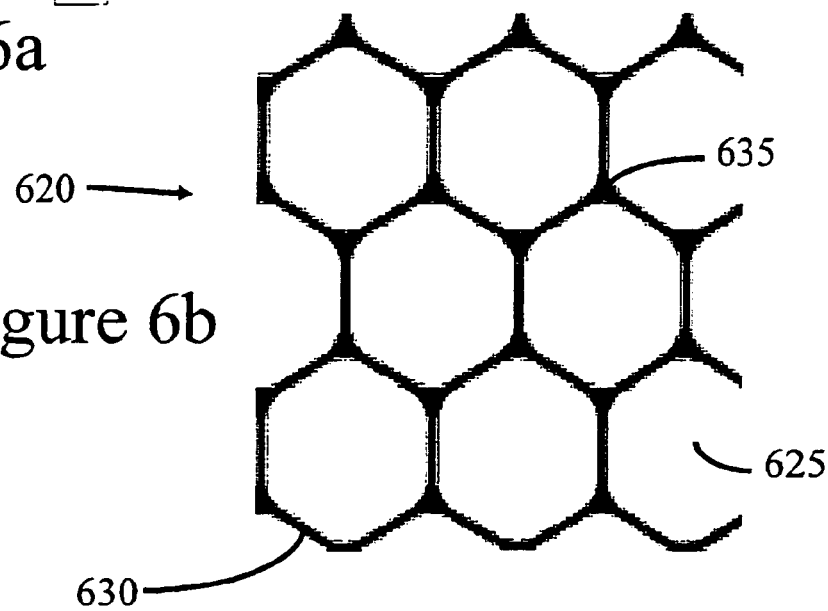
FIG. 6b is a diagram which represents a region of cladding made using the aforementioned preform.
Figure 7A:
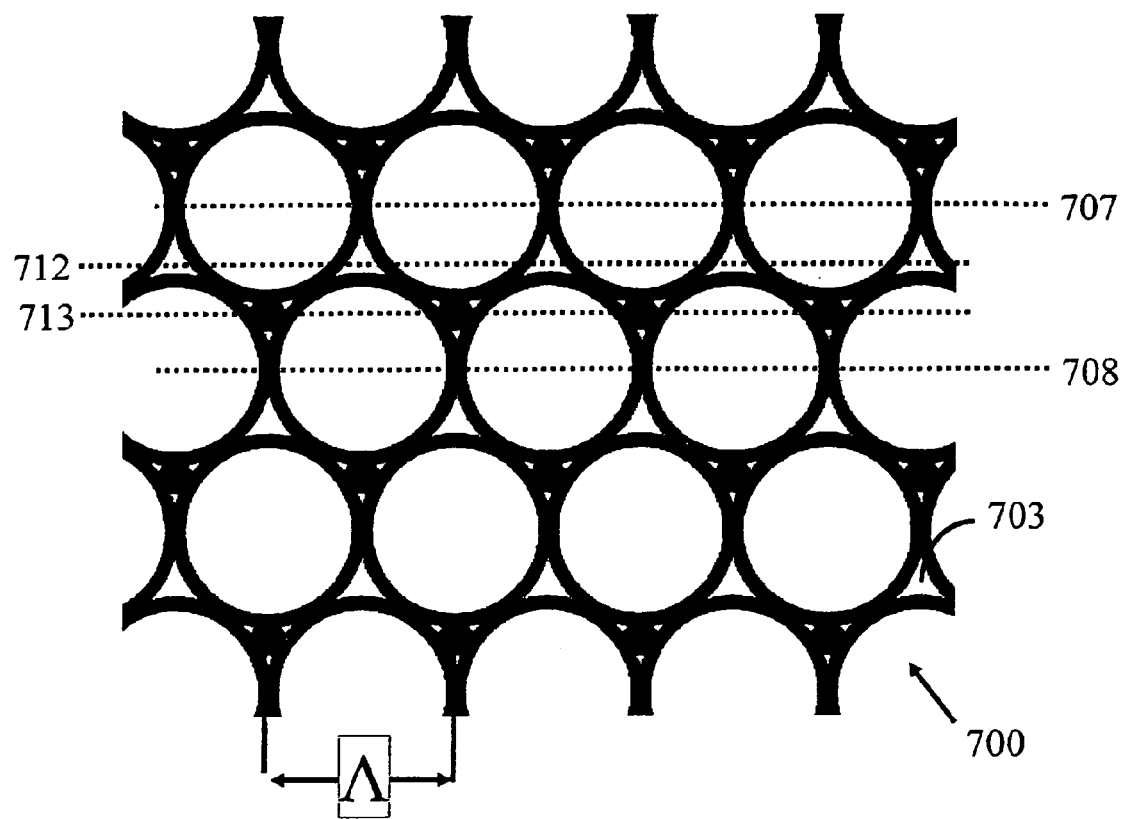
Figure 7B:
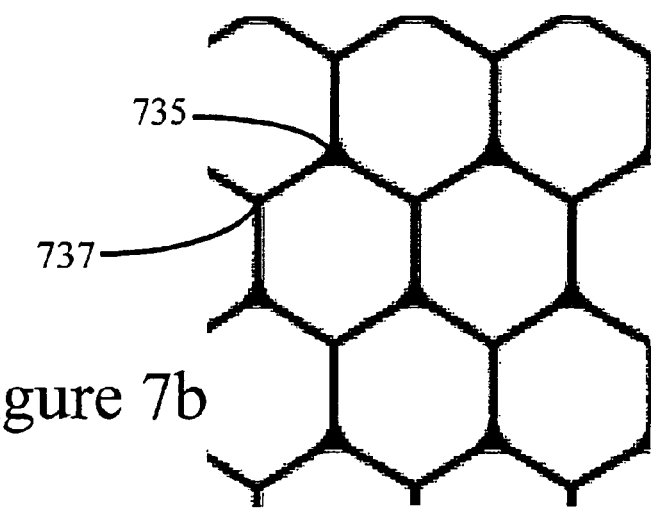
Figure 8:
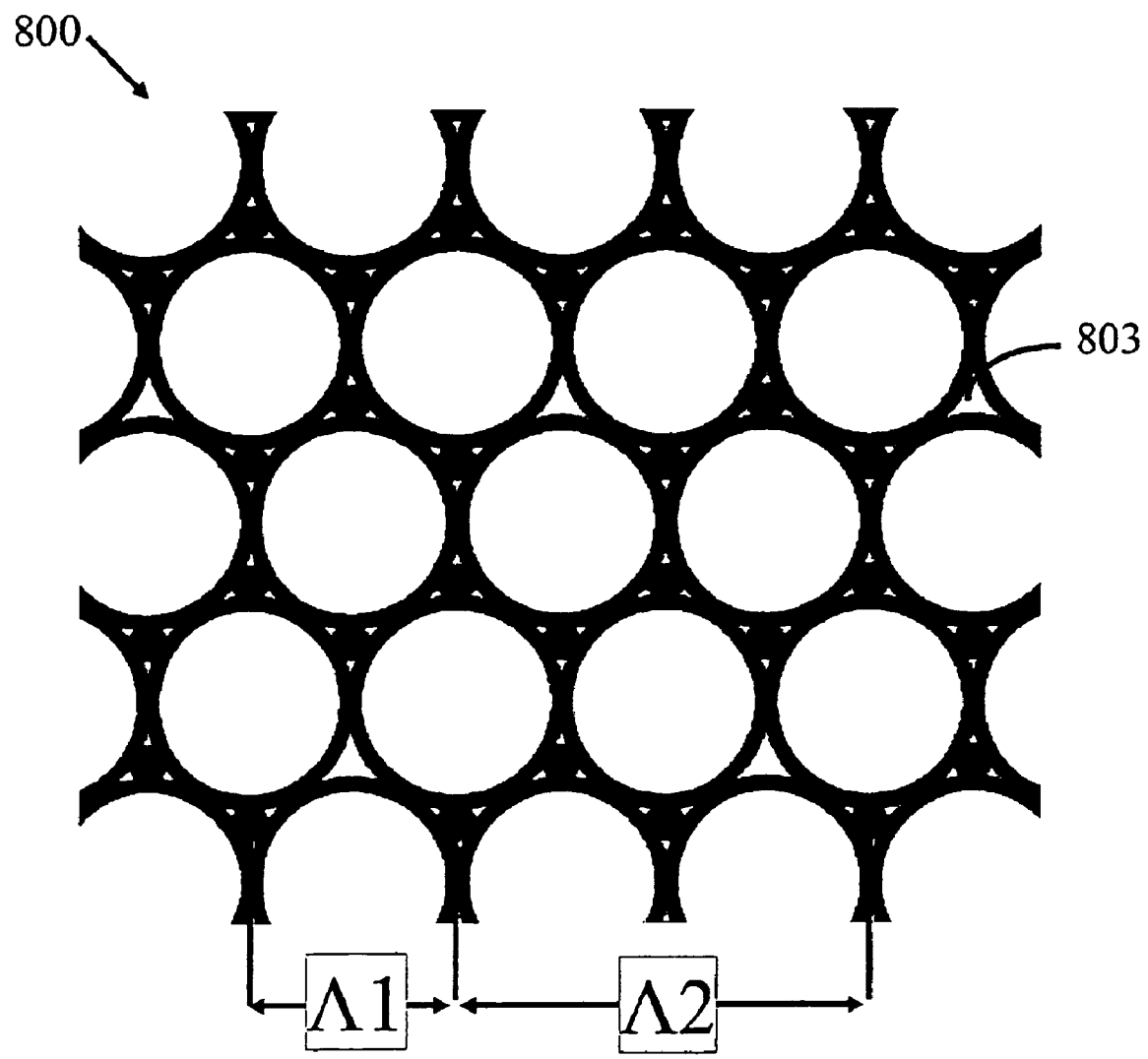
Figure 9:
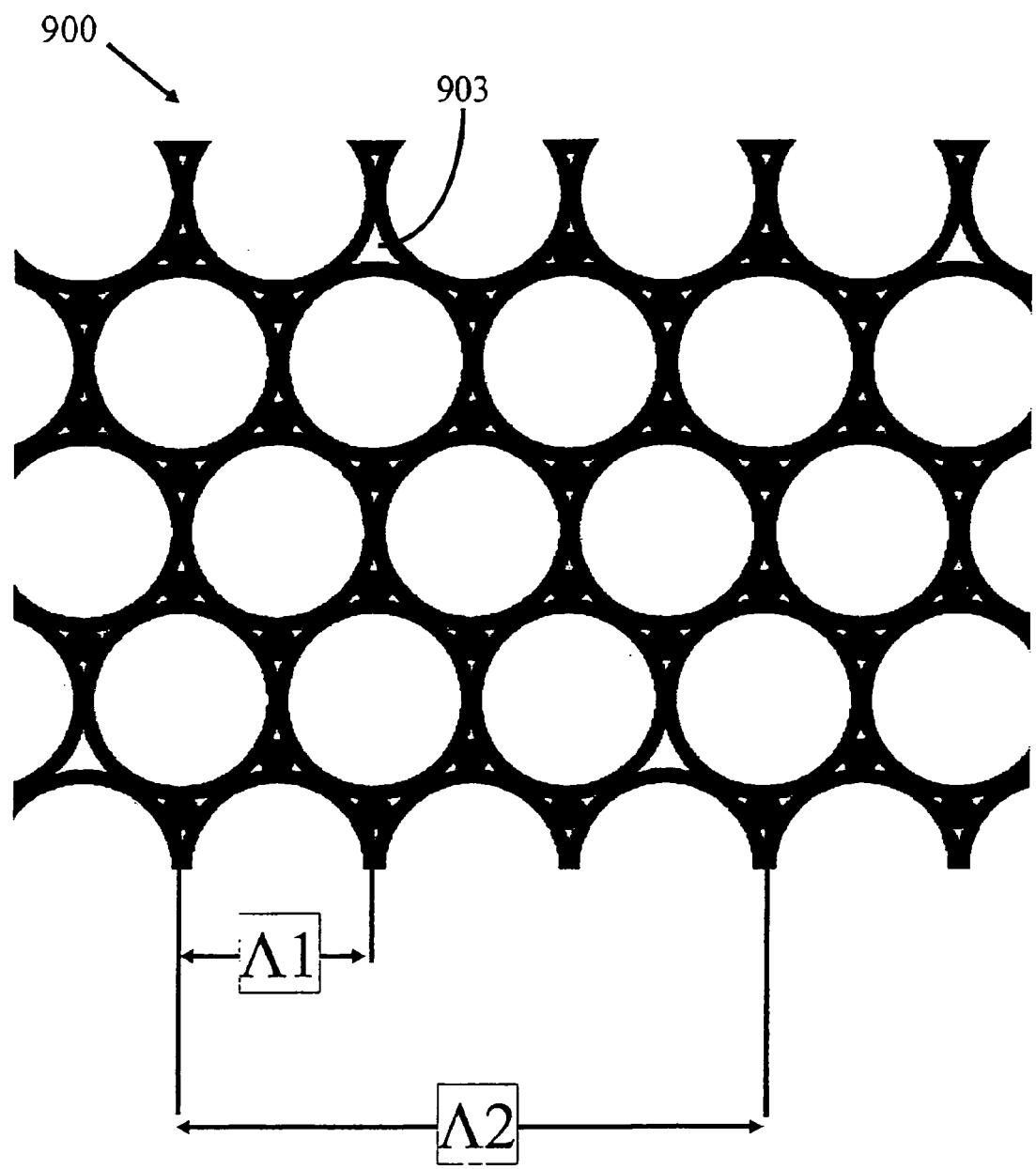
Figure 10:
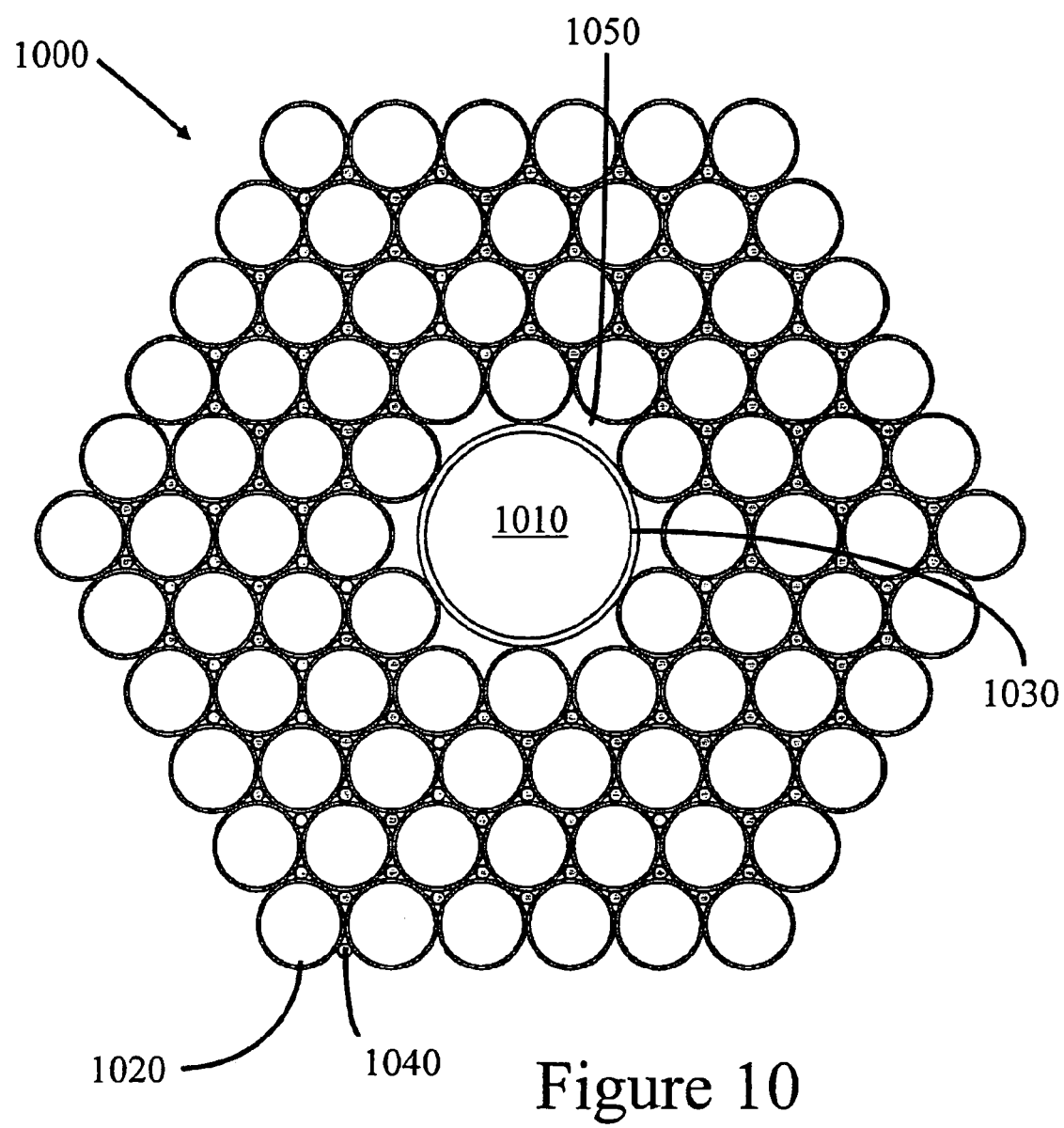
Figure 11:
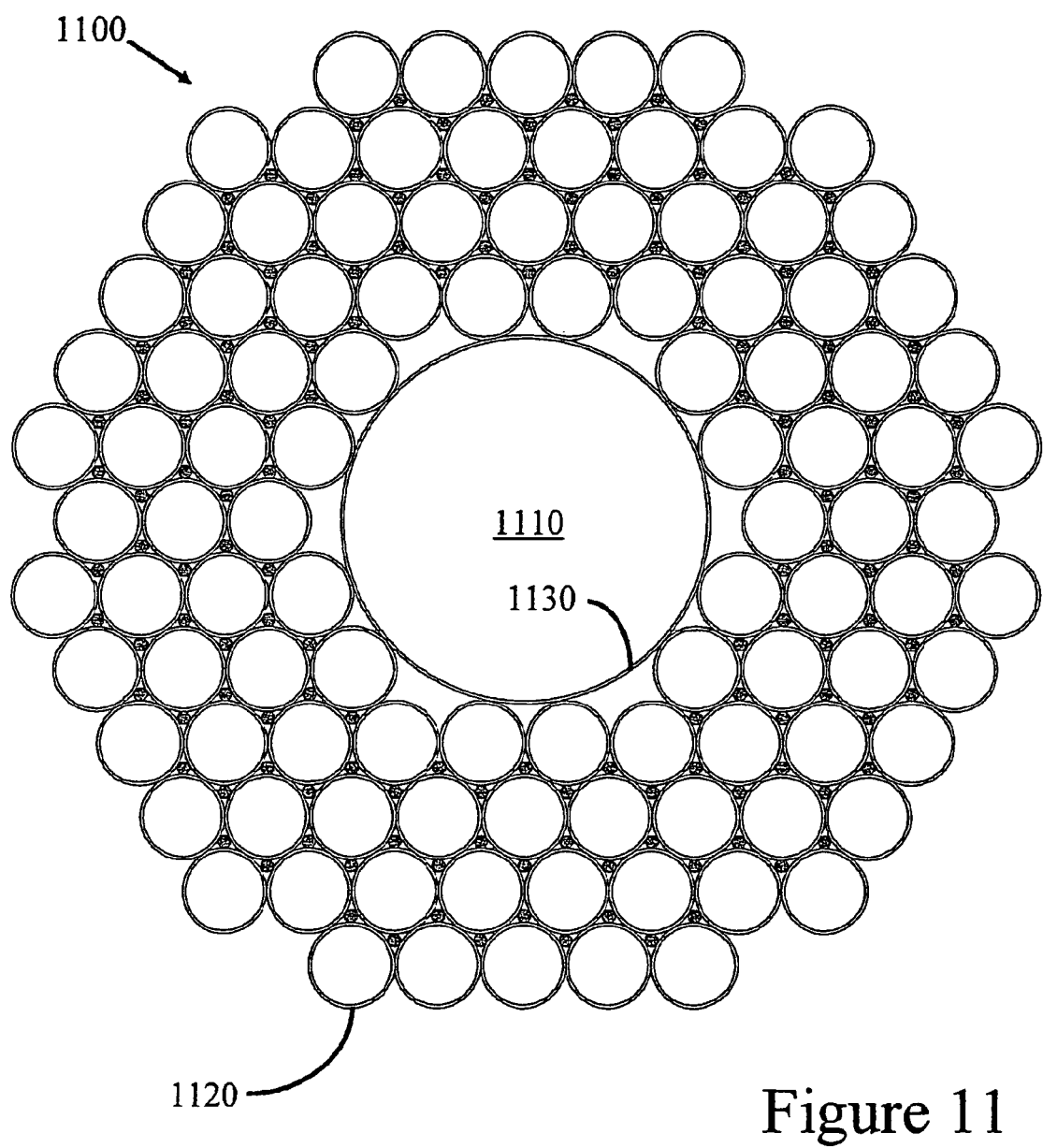
Figure 12A:
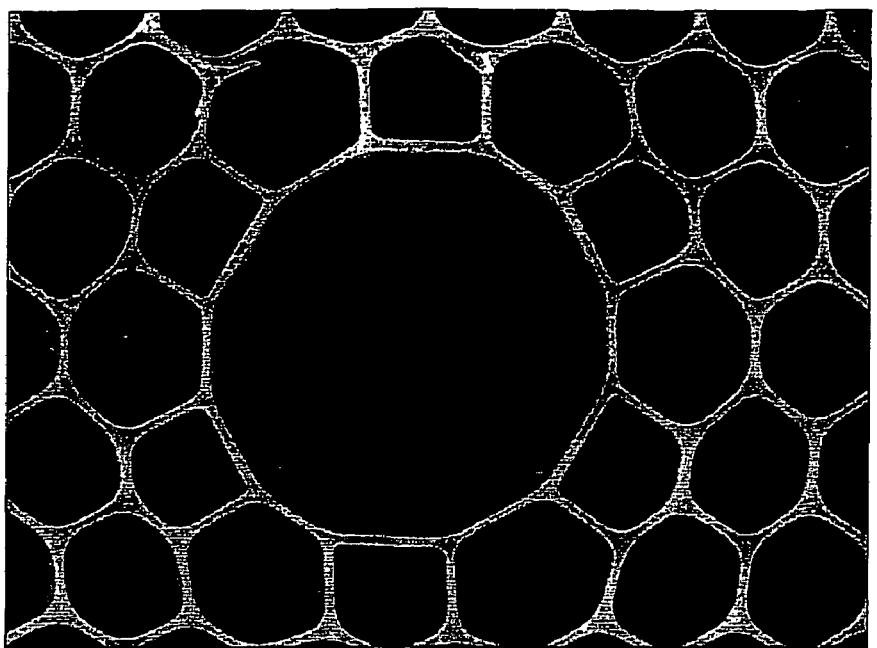
Figure 12B:
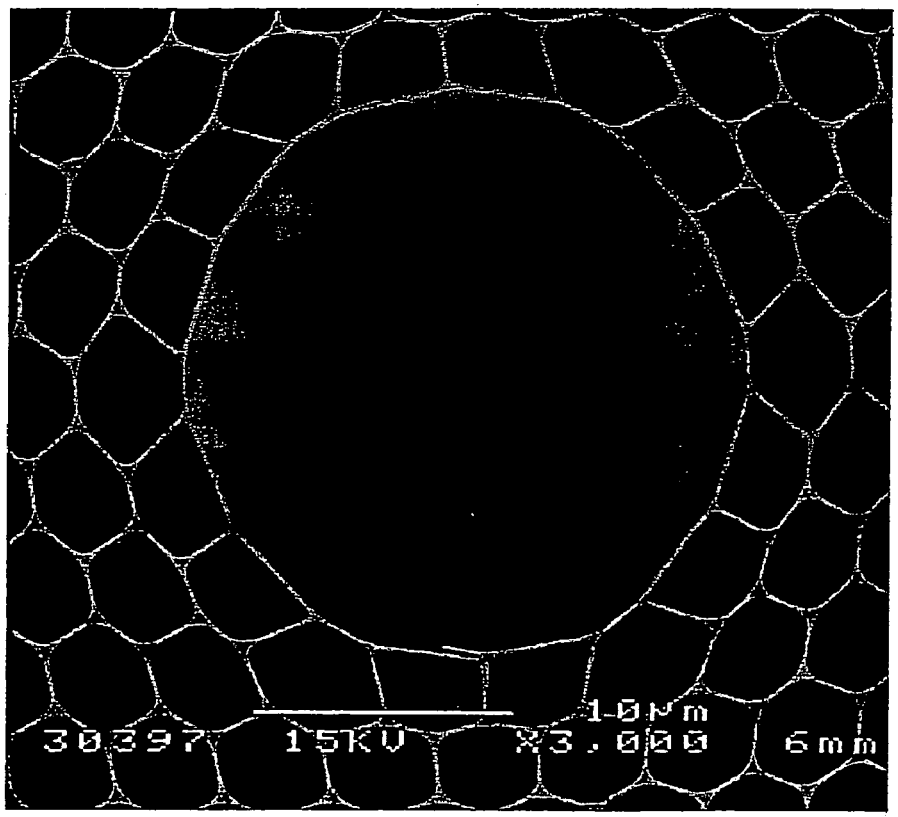
Figure 13:
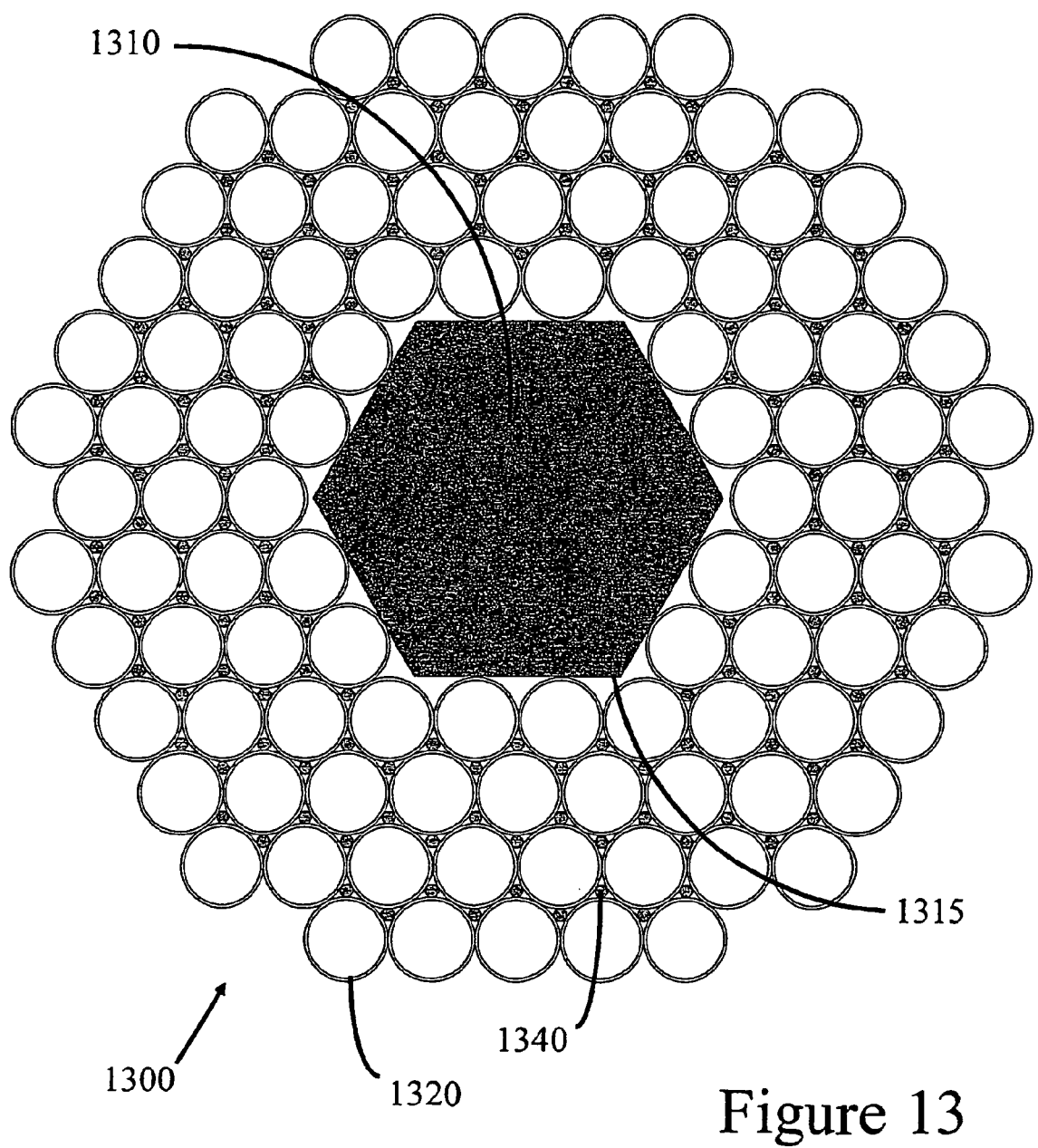
Figure 14A:
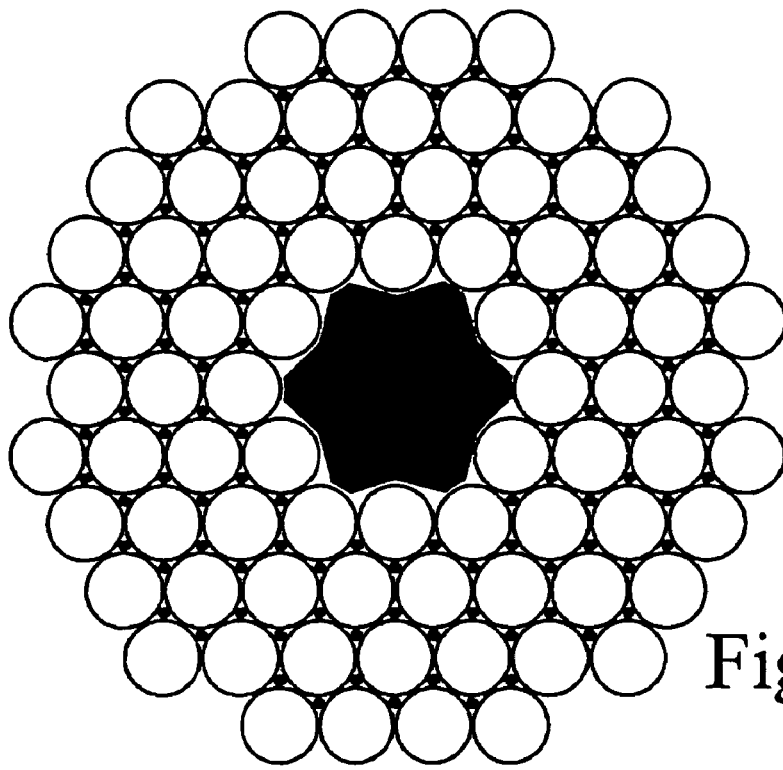
Figure 14B:
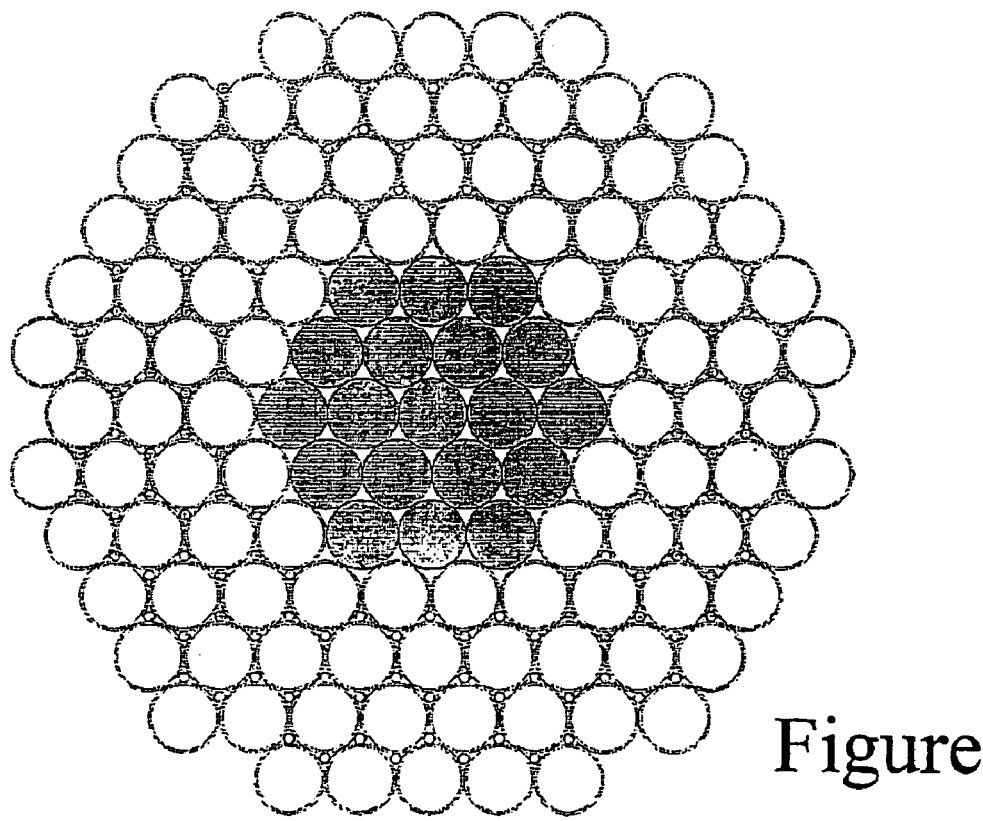
Figure 15:
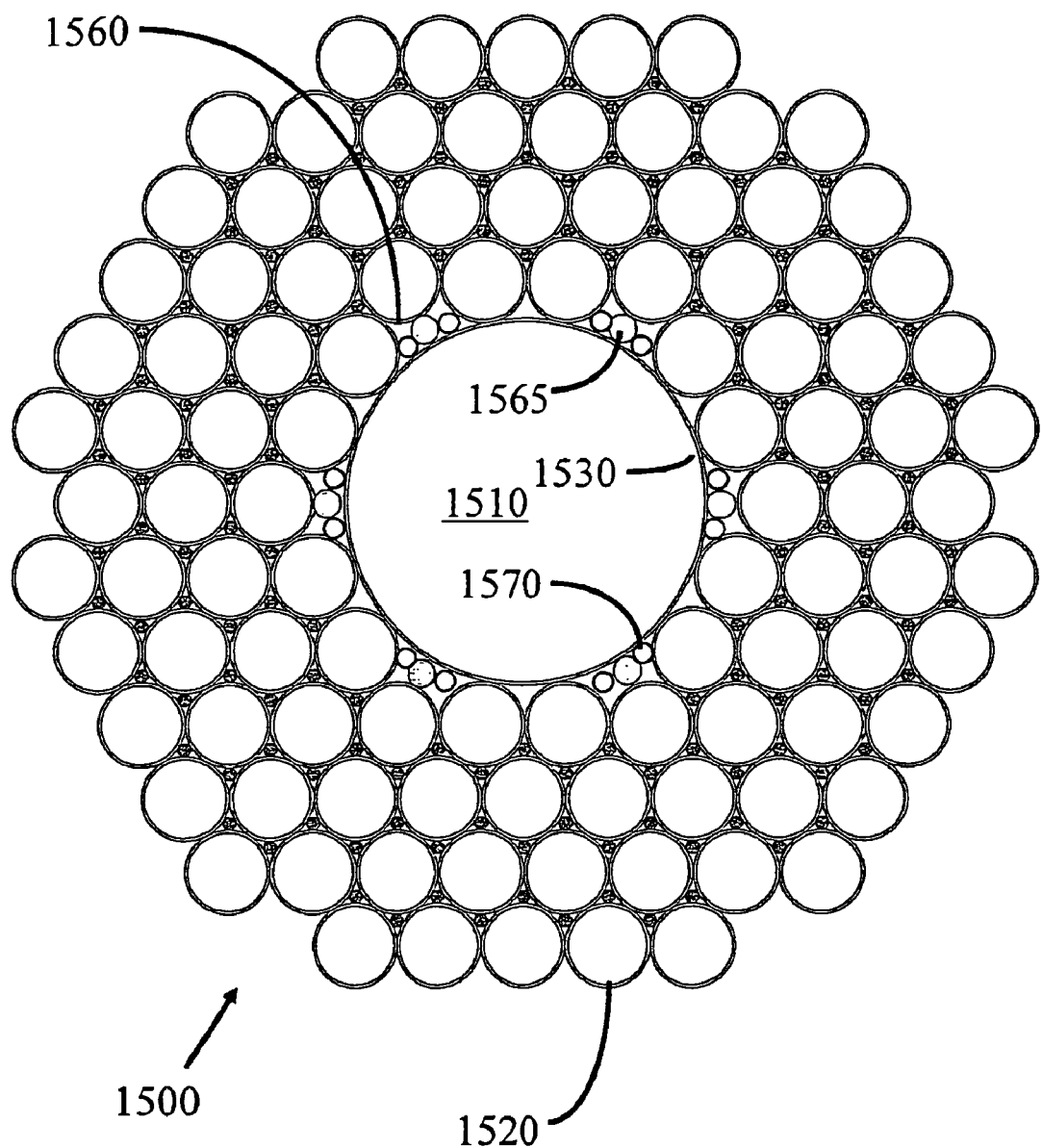
Figure 16:
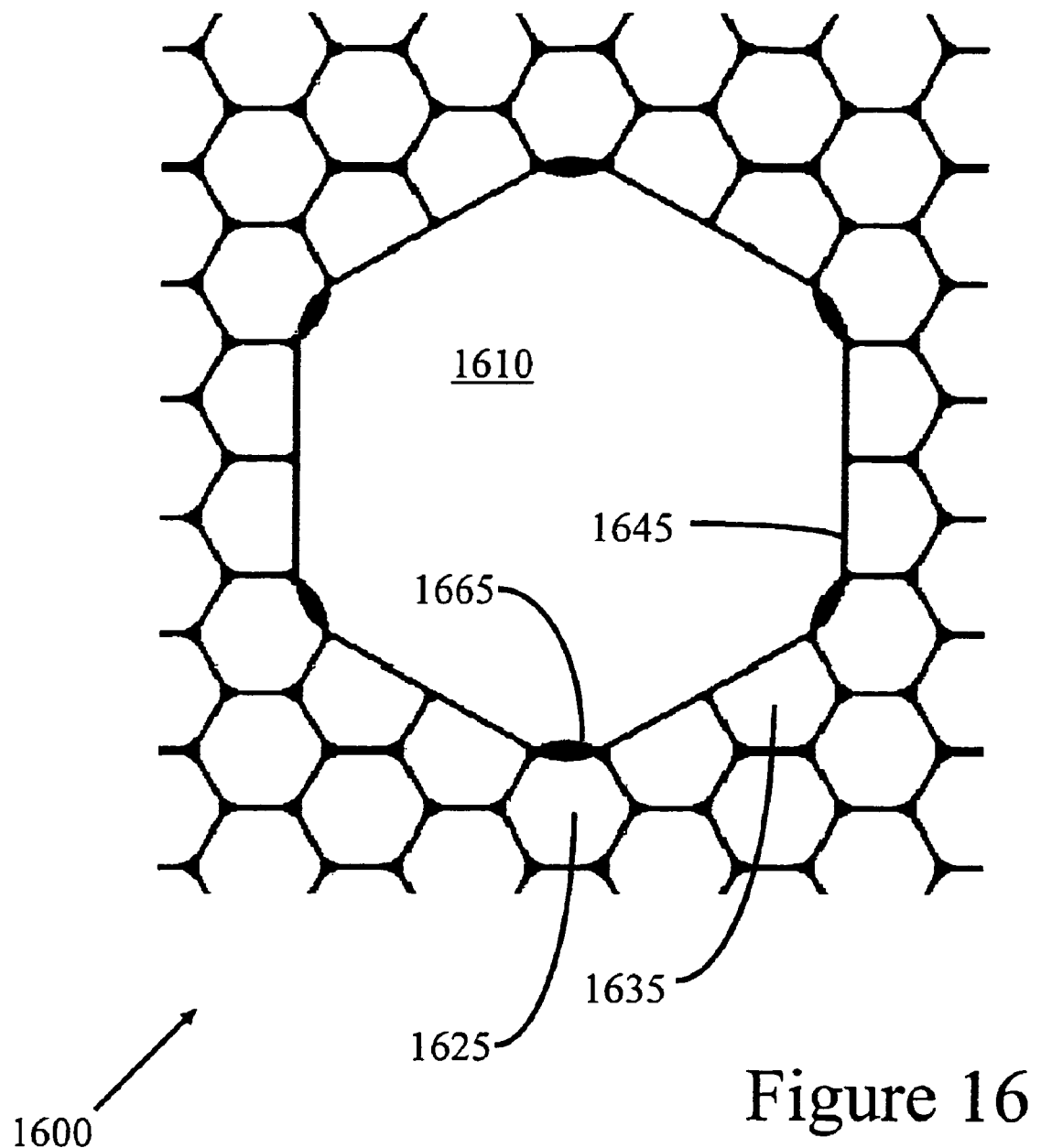
Figure 17:
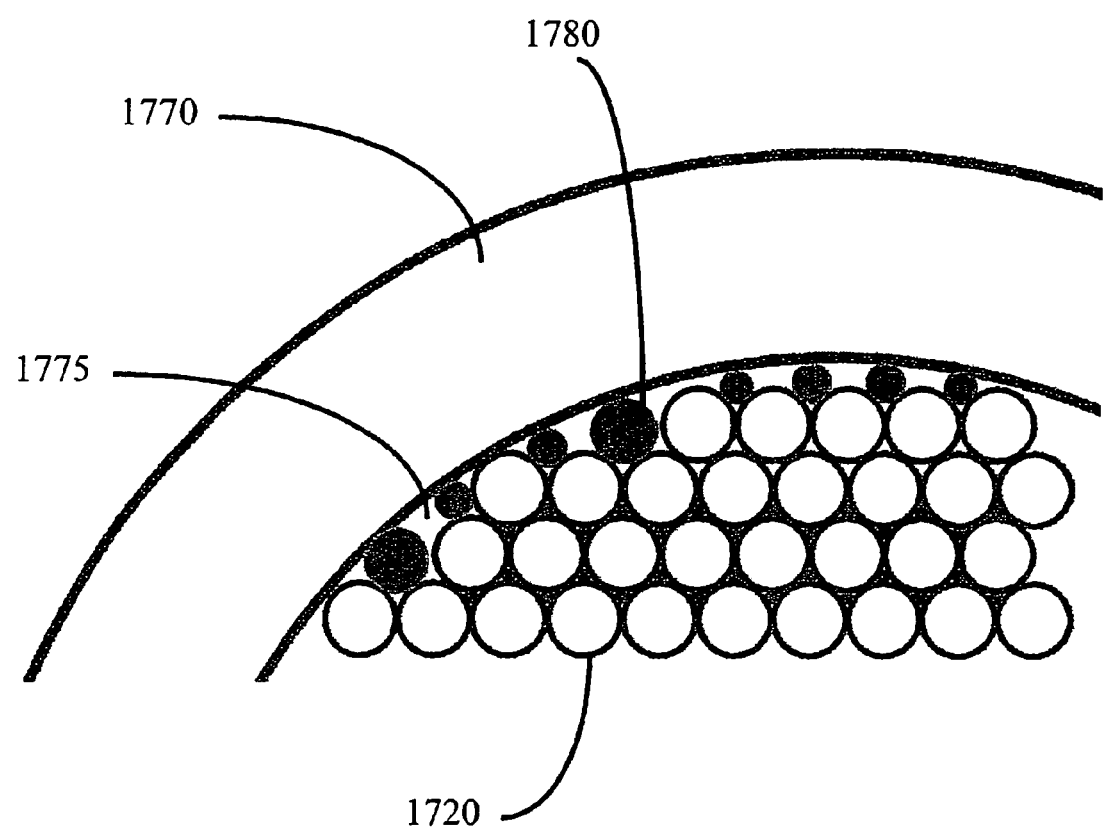
Figure 18:
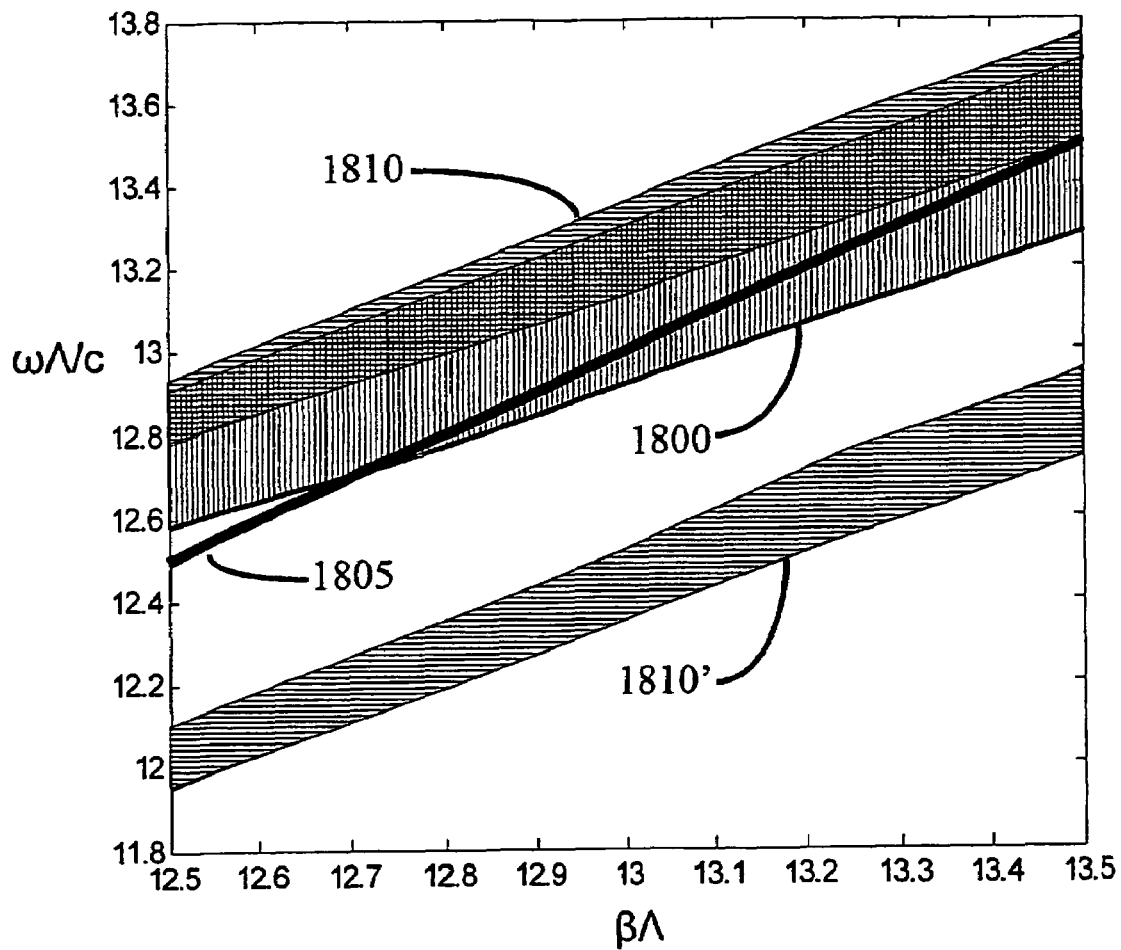
Figure 19:
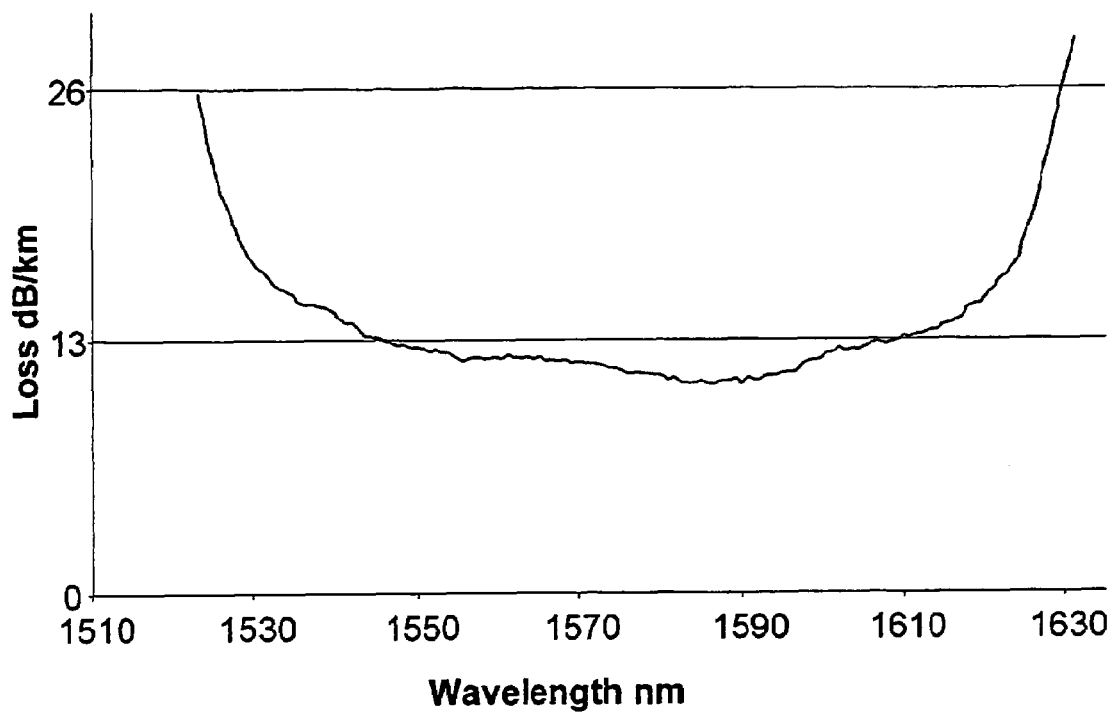

FIG. 7a is a diagram of a portion of a preform stack according to an alternative embodiment of the present invention, in which non-tessellating, circular cross section capillaries are stacked and form interstitial regions, wherein horizontal rows of regions alternate between all regions containing solid rods or all regions remaining as interstitial voids; FIG. 7b is a diagram which represents a region of cladding made using the aforementioned preform;

FIG. 8 is a diagram of a portion of a preform stack according to another embodiment of the present invention, in which non-tessellating, circular cross section capillaries are stacked and form interstitial regions, wherein every other region along every fourth horizontal row of regions is an interstitial void and all other regions contain solid rods;

FIG. 9 is a diagram of a portion of a preform stack according to an embodiment of the present invention, in which non-tessellating, circular cross section capillaries are stacked and form interstitial regions, wherein every third region along every sixth row of regions is an interstitial void and all other regions contain solid rods;

FIG. 10 is a diagram of a preform stack according to an embodiment of the present invention, in which non-tessellating, circular cross section capillaries are stacked and an inner region of the stack is supported around a larger capillary, which is large enough to replace seven missing capillaries;

FIG. 11 is a diagram of a preform stack according to an embodiment of the present invention, in which non-tessellating, circular cross section capillaries are stacked and an inner region of the stack is supported around a larger capillary, which is large enough to replace nineteen missing capillaries;

FIGS. 12a and 12b are scanning electron micrograph (SEM) images of PBG fibres made using preforms of the kind shown in FIGS. 10 and 11 respectively;

FIG. 13 is a diagram of a preform stack according to an embodiment of the present invention, in which non-tessellating, circular cross section capillaries are stacked and an inner region of the stack, equivalent in size to nineteen missing capillaries, is supported around a removable, hexagonal insert;

FIGS. 14a and 14b are diagrams of alternative preform stacks according to embodiments of the present invention, in which non-tessellating, circular cross section capillaries are stacked and an inner region of each stack is supported around an alternative form of removable insert;

FIG. 15 is a diagram of a preform stack according to an embodiment of the present invention, in which non-tessellating, circular cross section capillaries are stacked and an inner region of the stack is supported around a large capillary, which is large enough to replace nineteen missing capillaries, and relatively large interstitial regions that form between the large capillary and the other capillaries contain a solid rod sandwiched between two relatively small capillaries;

FIG. 16 is a diagram of an inner region of an exemplary PBG fibre made using a preform stack of the kind shown in FIG. 15;

FIG. 17 is a diagram of an outer region of a preform stack according to an embodiment of the present invention, wherein the preform stack is contained in a large, thick-walled capillary and interstitial regions between the inner surface of the large, thick-walled capillary and the stack contain various sizes of solid rod;

FIG. 18 is a graph showing two kinds of photonic band-gap; a first band-gap resulting from a PBG cladding of the kind shown in FIG. 6b and a second, split band-gap resulting from a PBG cladding of the kind shown in FIG. 7b; and FIG. 19 is a transmission loss graph for the fibre shown in the image in FIG. 12b.

Figure 1A:
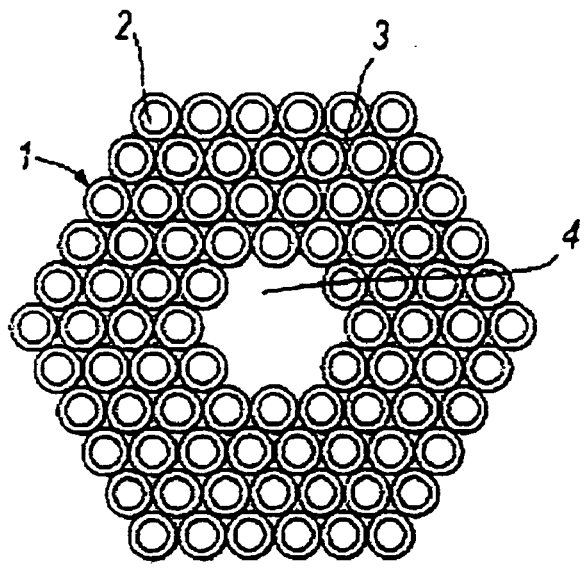
FIG. 1 is a diagram of a prior art preform stack arrangement used for making a photonic PBG optical fibre.
Figure 1B:
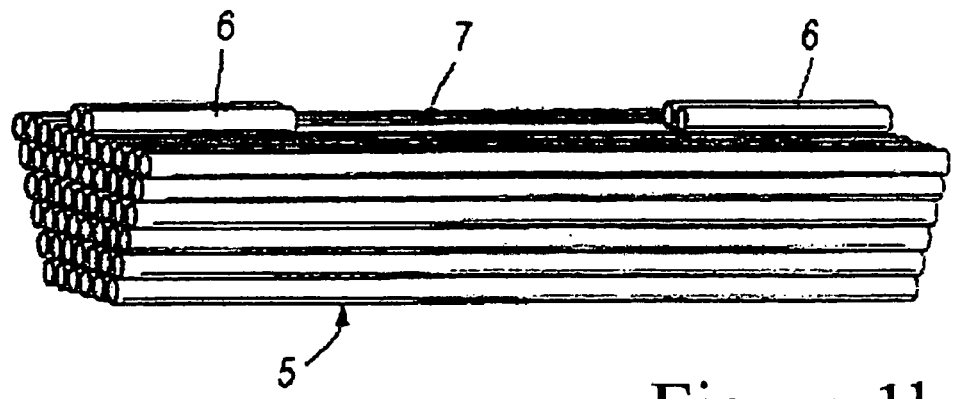
Figure 2:
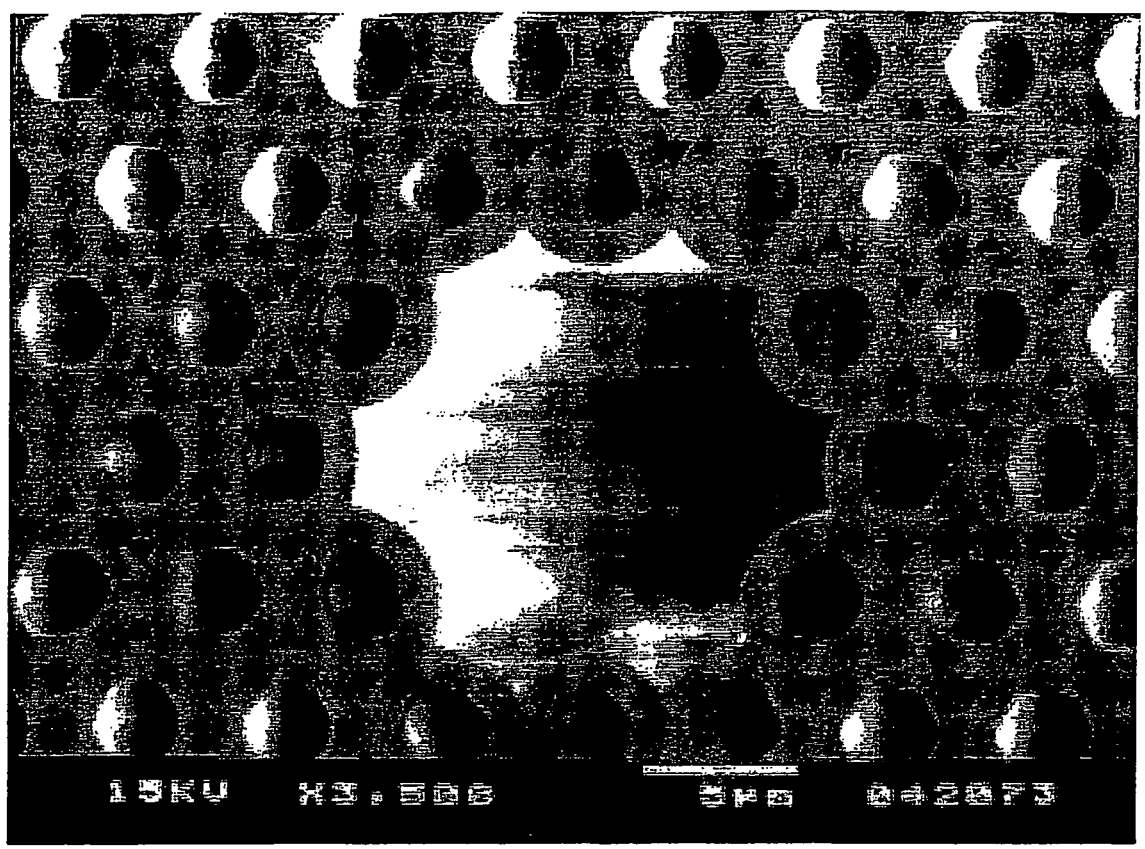
FIG. 2 is an image of an exemplary PBG fibre made using a preform stack of the kind shown in FIG. 1.
Figure 3:
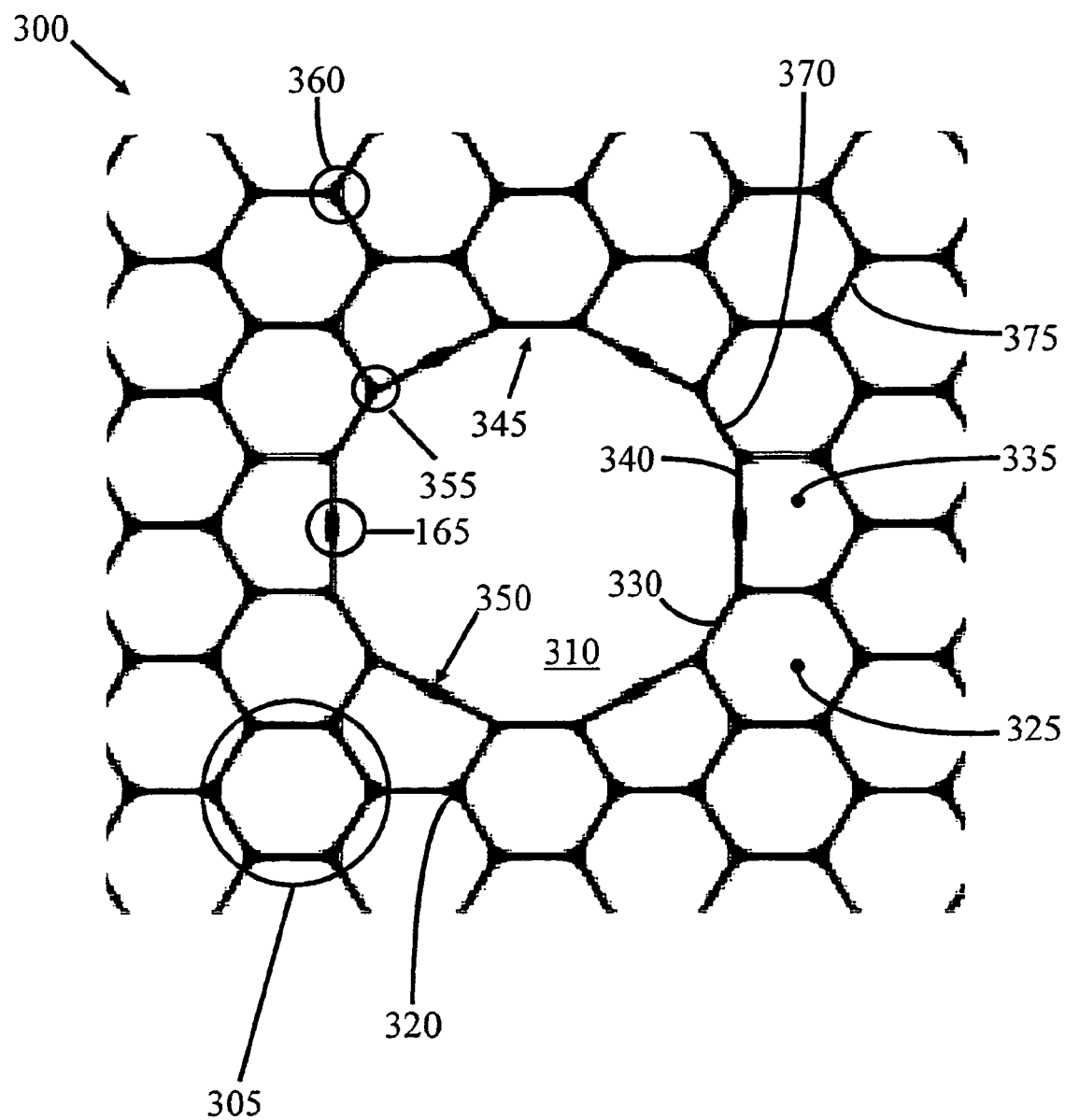
FIG. 3 is a diagram of an alternative exemplary PBG fibre of the kind known from the prior art.
Figure 4:
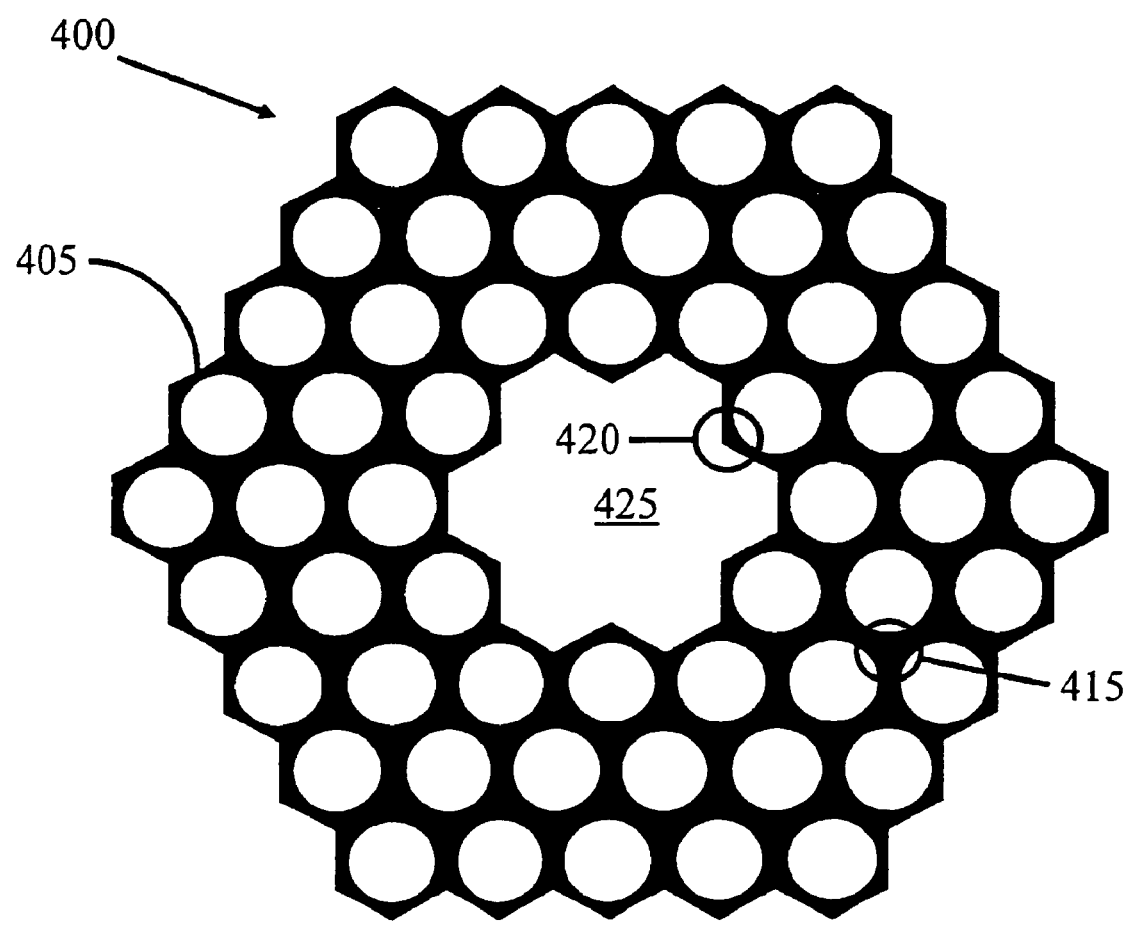
FIG. 4 is a diagram of a preform stack suitable for making a PBG fibre according to FIG. 3.
Figure 5A:
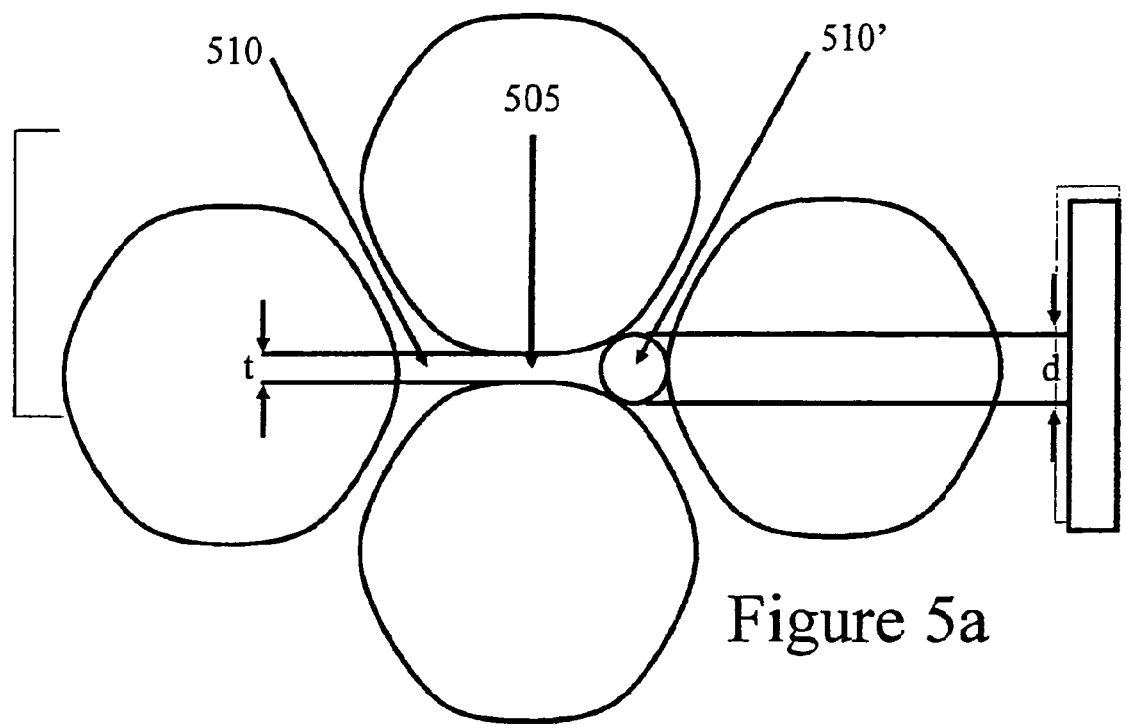
FIG. 5a is a diagram showing how to identify various dimensions of an exemplary PBG fibre cladding structure.

FIG. 5a is a schematic, cross-sectional diagram of a portion of a triangular array cladding structure, for example, of the PBG fibre of FIG. 3. This kind of structure is generally representative of at least the more recent low loss prior art PBG fibres, which have a generally high AFF. As illustrated, there are two nodes, 510 and 510', each connected to three veins; where only one full vein is shown between the two nodes. A node has a diameter d, defined herein as the diameter of the largest inscribed circle that fits within the node. A vein has a thickness t, measured at the mid-point 505 between nodes.

Figures 5B, 5C:
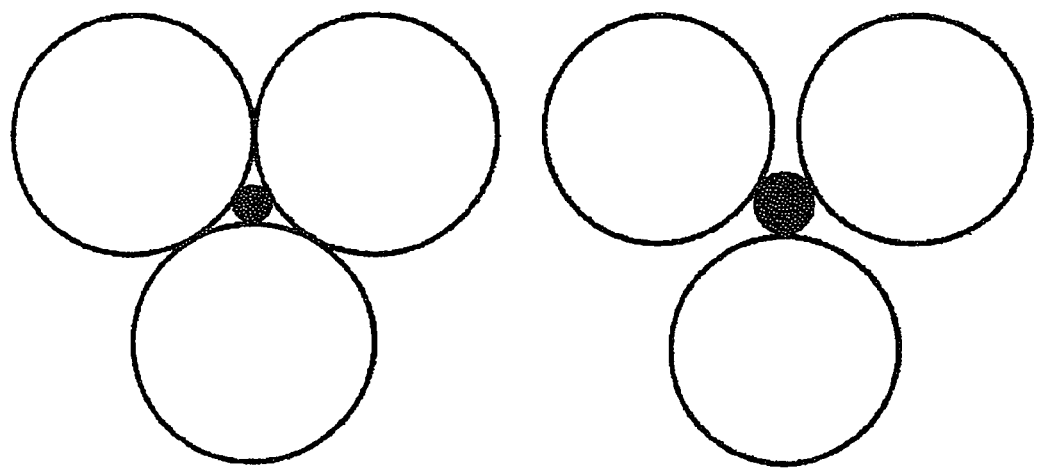
FIGS. 5b and 5c are diagrams illustrating respectively close-packed and non-close-packed arrangements of capillaries and rods for exemplary preform stacks.

FIG. 5b is a schematic representation of one way in which cladding capillaries according to embodiments of the present invention may be arranged. In this Figure, only three relatively large cladding capillaries are shown arranged in a triangular arrangement and a single rod is in the interstitial region that forms in between the three cladding capillaries. As shown, the three cladding capillaries are close-packed and abutting about the interstitial region; each capillary abutting both other capillaries. In addition, the rod is shown abutting all three capillaries. It is clear that the rod could be smaller or could be replaced by a small capillary having a similar or smaller outer diameter as the rod without affecting the arrangement of the cladding capillaries. Indeed, the rod (or small capillary) could be replaced by plural even smaller rods and/or capillaries. For smaller dimensioned rods or capillaries, it is clear that they will not abut all three capillaries but, rather, will rest on the lower capillaries in the respective interstitial region of the stack.

FIG. 5c is a schematic representation of an alternative way in which cladding capillaries according to embodiments of the present invention may be arranged. In this Figure, only three relatively large cladding capillaries are shown arranged into a triangular arrangement and a single rod is in the interstitial region surrounded by the three cladding capillaries. As shown, the three cladding capillaries are not close-packed and abutting about the interstitial region. Instead, the rod spaces-apart the cladding capillaries, and is abutting all three capillaries. It is clear that the rod could be smaller or larger than as shown, and the cladding capillaries would be spaced closer or further away respectively from one another as a result. In addition, the rod could be replaced by a small capillary having a similar outer diameter without affecting the arrangement of the cladding capillaries. Indeed, the rod (or small capillary) could be replaced by plural even smaller rods and/or capillaries. In any event, for the cladding capillaries to remain spaced apart as shown, it is clear that at least one of the rods and/or small capillaries in such an arrangement will abut each of the three capillaries.

In general, embodiments described hereinafter will for convenience use an arrangement of cladding capillaries and rods (where rods are present) according to the arrangement illustrated in FIG. 5b. However, the skilled person will appreciate that other configurations, for example as shown in FIG. 5c, or using other combinations and sizes of rods and/or small capillaries, could be used. Indeed, other arrangements, for example square arrays or hexagonal arrays, of cladding capillaries could be used with any of the aforementioned optional rod and capillary configurations. In these cases, it is clear that, even in close-packed arrangements of cladding capillaries, each cladding capillary would abut at most two other cladding capillaries around a given interstitial region.

According to an embodiment of the present invention, as illustrated in the diagram in FIG. 6a, a preform stack 600 (only a representative portion of which is illustrated) is assembled from abutting, circular cross section capillaries arranged in a triangular array and solid circular cross section rods 610 that rest in the interstitial regions that form due to the non-tessellating nature of the circular capillaries. An exemplary region of PBG cladding structure 620, resulting from the stack, is illustrated in FIG. 6b. The cladding comprises an array of generally hexagonal holes 625 separated by relatively thin veins 630, joined at the ends by nodes 635. The diameters d of the nodes are larger than the thickness t of the respective veins.

The stack of FIG. 6a has a characteristic, primitive unit cell and a pitch Λ. A primitive unit cell is a unit cell of the structure, having a smallest area (in the transverse cross section) that, by vector translations, can tile and reproduce the entire structure without overlapping itself or leaving voids. The pitch Λ is the minimum translation distance between two neighbouring primitive unit cells. The pitch Λ in FIG. 6a is equal to the outer diameter of a capillary, assuming all capillaries have the same diameters. In addition, it is clear that the pitch Λ applies to the capillaries taken alone and also to the solid rods taken alone.

The manual task of arranging a stack of the kind shown in FIG. 6, comprising circular cross section capillaries and solid rods, is clearly a more cumbersome task than arranging only hexagonal rods according to prior art preform stacks. However, the present inventors have found that preform stacks according to embodiments of the present invention have a number of advantages over the prior art preform stacks. One advantage is that it is relatively easy to draw down a wide range of different sizes of circular cross section capillaries and rods from readily-available glass preforms. In contrast, it is necessary to make bespoke hexagonal capillaries, typically by extruding or milling glass preforms, to a desired size, and it is not trivial to draw down individual hexagonal capillaries any further without losing the form of the capillaries due to surface tension in the glass. Another advantage of the present kind of stack is that use of solid rods to fill interstitial regions significantly increases the flexibility of cladding, and overall PBG fibre, design, as will become apparent from the following description.

According to a second embodiment of the present invention, a preform stack 700 (only a representative portion of which is illustrated) is formed according to the diagram in FIG. 7a. In this stack, there are a number of interstitial voids 703 (interstitial regions not containing rods). Specifically, between neighbouring horizontal rows of capillaries, 707 and 708, there are two identifiable rows of interstitial regions: an upper row 712 in which each interstitial region resides above a lower capillary and a lower row 713 in which each interstitial region resides below an upper capillary. In this embodiment, the interstitial regions residing above the lower row of capillaries are voids and the regions resting below the upper row of capillaries are filled with rods. The pattern of interstitial voids remains periodic in this embodiment, with a pitch equal to the pitch Λ of the cladding. That the pitches are the same is due to each primitive unit cell of the cladding being modified in the same way, by omission of a single rod.

FIG. 7b illustrates a portion of an exemplary PBG fibre cladding structure 720, drawn from a stack of the kind shown in FIG. 7a. As illustrated, the interstitial voids 703 in the preform result in relatively less pronounced cladding nodes 737 in the resulting cladding, whereas the filled interstitial regions result in more pronounced nodes 735 (the same as in FIG. 6b). This new cladding structure can be thought of as having a modulated arrangement of nodes.

Forming a preform stack 700 according to the aforementioned exemplary embodiment is easily enabled using circular cross section capillaries and rods. In contrast, it would not be possible to form the same stack using hexagonal cross section capillaries.

According to another embodiment of the present invention, a preform stack 800 (only a representative portion of which is illustrated) is formed according to the diagram in FIG. 8. In this stack, there are a number of interstitial voids 803 as in FIG. 7a. However, in this example, there are fewer interstitial voids. Specifically, compared with FIG. 7a, only every other interstitial region, of the regions residing above the lower capillaries, is empty. In addition, there are interstitial voids only between every other row of capillaries. This arrangement causes the interstitial voids to have a pitch Λ2, which is twice the pitch Λ1 of the capillaries alone. The pitch Λ of the overall cladding now equals the pitch Λ2.

The preform stack 900 illustrated in FIG. 9 is, in principle, similar to the embodiments in FIGS. 7a and 8. This time, however, only one in three interstitial regions 903 along a given row is empty and only one in three of the rows of regions that reside above a lower row of capillaries, contains voids. This leads to an interstitial void pitch Λ3 of three times the capillary pitch Λ1. Again, the pitch Λ of the overall cladding now equals the pitch Λ3.

Clearly, PBG fibres made from the preforms that are illustrated in FIG. 8 and FIG. 9 will have differently modulated arrangements of nodes than the arrangement in FIG. 7b. Again, it would not be possible to form the same stacks using hexagonal cross section capillaries according to the prior art.

The diagram in FIG. 10 illustrates one way of forming a preform stack 1000 including a seven cell core region 1010 according to an embodiment of the present invention. The core region 1010 is formed by assembling circular cross section capillaries 1020 in a close-packed triangular arrangement around a large diameter core capillary 1030, which is large enough to support capillaries around a region left by removal of seven capillaries: an inner capillary and the six capillaries around the inner capillary. The cladding capillaries 1020 have an outer diameter of about 1 mm and a wall thickness of about 0.05 mm and the large diameter core capillary 1030 has an outer diameter of about 2.6 mm and a wall thickness of about 0.05 mm. The large diameter core capillary 1030 supports the cladding capillaries while the stack is being formed and eventually becomes part of the material that forms a core defect boundary.

Interstitial voids 1020 that form at the at the mid-point of each close-packed, triangular group of three cladding capillaries are each packed with a glass rod 1040, which has an outer diameter of about 0.15 mm. The rods 1040 that are packed in voids assist in forming cladding nodes, which have a diameter d that is typically significantly greater than the thickness t of the veins that meet at the nodes. As already described, omission of a rod from a void in the cladding leads to the formation of a cladding node that has a relatively smaller diameter, for example close to the thickness of the respective adjoining veins.

The rods 1040 may be inserted into the voids after the capillaries have been stacked. Alternatively, the stack may be assembled layer by layer, with the rods that rest on top of capillaries being supported by an appropriate jig, for example positioned at either end of the stack, until the next upper layer of capillaries is in place to support those rods. In commercial scale operations, it is apparent that the manual task of forming a preform stack could readily be automated, using appropriately programmed robots, for example of the kind used in component laying for printed circuit boards.

The interstitial voids 1050 that are formed between the cladding capillaries 1020 and the large diameter capillary 1030 are not packed with any rods, thereby avoiding the formation of beads (of the kind seen in the prior art) and minimising the volume of glass that is available, during drawing of the stack 1000, for formation of boundary nodes. Therefore, by design, the arrangement of capillaries and rods shown in FIG. 10 leads to the formation of boundary veins that are generally straight and of generally constant thickness along their lengths between nodes.

An alternative exemplary preform stack 1100 is illustrated in FIG. 11. In this case a core region 1110 is defined by a larger diameter capillary 1130, having an outer diameter of around 4.5 mm, which supports cladding capillaries 1120 around a region left by removal of nineteen capillaries: an inner capillary, the six capillaries around the inner capillary and the twelve capillaries around the six capillaries. The dimensions of the cladding capillaries 1120 and rods 1140 are the same as in FIG. 10.

Either stack shown in FIG. 10 or 11 may be over-clad with a further, relatively thick walled capillary (for example, as illustrated in FIG. 17), which is large enough to contain the stack and, at the same time, small enough to hold the capillaries and rods in place. The entire over-clad stack is then heated and drawn into a fused pre-form, during which time all the interstitial voids 1050 at the boundary, and remaining voids between the glass rods and the cladding capillaries, at least partially collapse due to surface tension. The pre-form is, again, over-clad with a final, thick silica cladding and is heated and drawn into optical fibre in a known way, in the process of which any remaining interstitial voids should collapse entirely. As already described, if surface tension alone is insufficient to collapse the interstitial voids, a vacuum may be applied to the interstitial voids of the pre-form during drawing, for example according to the process described in WO 00/49436 (The University of Bath).

The thickness of the core boundary in a fibre resulting from a preform of the kind illustrated in FIG. 10 or FIG. 11 is controlled in part by selecting an appropriate thickness of the initial core capillary. A limiting factor in reducing the wall thickness would typically be the ability to make such a respective thin-walled capillary.

The SEM image in FIG. 12*a* shows the inner region of a fibre made using a preform stack of the kind illustrated in FIG. 10. As can be seen, the fibre has a core boundary region of glass comprising twelve veins. The veins are generally smooth along their lengths—with their thinnest points typically at their mid-points—and they clearly do not have beads along any veins, in contrast to the prior art structure illustrated in FIG. 3. The lack of beads along the boundary veins is a function of making a fibre from a stack according to embodiments of the present invention. It would, in contrast, be difficult to form a PBG fibre having similar smooth boundary veins by using a stack comprising hexagonal cladding capillaries.

An image of a PBG fibre, drawn from a preform of the kind illustrated in FIG. 11, is shown in FIG. 12*b*. Again, the core boundary veins of the PBG fibre are generally straight and smooth by design and the core defect is a nineteen cell core defect.

The cladding regions of the fibres in FIGS. 12*a* and 12*b* have AFF values of between 0.85 and 0.92. Lower and higher values of AFF are achievable using a similar preform construction and varying cladding capillary wall thickness. The AFF value can also be varied for a given preform stack by drawing the fibre while pressurising the cladding and core holes at an appropriate level. A relatively higher pressure will tend to cause the resulting fibre to have a higher AFF, relative to that of the preform, while a relatively lower pressure will tend to cause the resulting fibre to have a lower AFF. In any case, it is necessary to pressurise the core hole to a lower level than the cladding holes, since a lower pressure is required to counteract the surface tension in a relatively large hole than in a relatively small hole during drawing.

In general, the present inventors have identified a number of advantages of having smooth boundary veins as opposed to 'beaded' boundary veins. For example, smooth veins are advantageous for reasons described in detail in the applicant's co-pending patent application having the title "Enhanced Optical Waveguide" (Ref. 0065WO) filed on the same date here as. Such advantages could not be readily realised if a fibre were made using a preform made from hexagonal cross section capillaries.

A further alternative preform stack according to an embodiment of the present invention is illustrated in FIG. 13. The stack 1300 is different, compared with the stack in FIG. 12, only by omission of a large diameter core capillary.

Instead of a core capillary, the cladding capillaries 1320 and rods 1340 are assembled around an insert 1315, for example made from graphite, platinum, tungsten or a ceramic material, which is in a central region 1310 of the stack and which has a higher melting point than silica glass and, preferably in addition, a higher coefficient of thermal expansion. The stack 1300 is heated to allow the capillaries 1320 and rods 1340 to fuse around the insert 1315. The pre-form is then allowed to cool and the insert 1315 is removed. It will be apparent that, at this point, the core defect would take on the hexagonal shape of the insert. An advantage of using an insert material having a higher coefficient of thermal expansion than silica is that, when the pre-form and insert are heated, the insert expands and increases the area of the central region 1310 and, when permitted to cool down again, the insert shrinks back down to its original size and the silica solidifies leaving an inner region that is larger than the insert. The insert 1315, which, as a result, is loose-fitting in the central region, may then be removed readily from the pre-form with reduced risk of damaging or contaminating the pre-form. The resulting pre-form, which comprises a fused body of silica, is then heated and drawn in the usual way to form a PBG fibre. During the drawing step, it will be appreciated that the corners of the hexagonal core region will, by virtue of surface tension, retract and flatten off, leaving a twelve-sided, smooth walled core defect closely resembling that in FIG. 12*b*, again with no bead along any veins.

Preform stacks of the kind illustrated in FIG. 13 may find application, for example, when it is desirable to produce a PBG fibre having an even thinner core boundary wall than would be attainable by using a core capillary.

On the basis of the foregoing discussion, it will be apparent to the skilled person that the use of an insert in the formation of a pre-form is not limited to formation of nineteen-cell core defect structures and could be applied to making pre-forms for other core defect sizes, for example one-cell, seven-cell, twelve cell or thirty-seven cell core defect structures. Indeed, all of these structures have a core defect notionally centred on a primitive unit cell. Of course, a structure could be made, which has a core defect centred on a notional node and which lies at the mid-point of three notional neighbouring primitive unit cells. For example, the core defect could be made by removing three primitive unit cells that are arranged in a regular triangle, or three primitive unit cells as well as the nine primitive unit cells around the three primitive unit cells, etc. Further, inserts having, for example, star-shaped, elongate, circular, square, rectangular, elliptical or irregular cross sections, or any other practical shape for that matter, could be applied to making pre-forms for fibre structures (see, for example, the preform stack having a star shaped insert illustrated in FIG. 14*a*). Additionally or alternatively, inserts could be made by combining plural pieces. For example, an insert could be assembled from plural elongate members having similar cross sections to the capillaries, as illustrated in FIG. 14*b*. As such, the insert could be made to match the cladding very closely, which may prove advantageous.

As shown in FIGS. 10 and 11, there are a number of relatively large interstitial voids between the core capillary and the cladding capillaries. During fibre draw down, it is typically necessary to evacuate these voids (for example, according to WO00/49436) in order that the voids collapse to leave the respective boundary veins smooth. However, in alternative embodiments, it may be desirable to fill at least some of the voids with one or more additional rods or capillaries. Such an embodiment is illustrated in FIG. 15, wherein relatively large interstitial voids 1560 around a core region 1510 form between cladding capillaries 1520 and a large diameter core capillary 1530 are each filled with a solid rod 1565 positioned between two small capillaries 1570. The small capillaries 1570 are used to maintain the position of the intervening solid rods 1565 in the stack and would collapse due to surface tension, or be evacuated to cause them to collapse, during a fibre draw. These small capillaries 1570 would contribute significantly less to the glass volume in a final fibre than the accompanying rods 1565.

FIG. 16 illustrates an exemplary PBG fibre structure 1600 made from a preform of the kind shown in FIG. 15. As can be seen, the fibre structure comprises a core boundary region 1645 surrounded by eighteen holes: twelve pentagonal holes 1635 and six hexagonal holes 1625. In this example, the structure, by design, exhibits beads 1665 along the veins of each of the hexagonal holes. The beads 1665 result from the additional rods 1565 and capillaries 1570 that were introduced into the interstitial voids 1560 between the core capillary 1530 and the cladding capillaries 1520 of the respective stack. It will be noticed that the beads 165 on the boundary of the prior art structure illustrated in FIG. 3 are, by default, located along the boundary veins of pentagonal holes around the core boundary, as they correspond to the inwardly-facing corners of hexagonal capillaries. In contrast, a stack according to embodiments of the present invention permits a fibre maker to chose to introduce beads (or other protrusions) at different locations around the core boundary. Advantages of selectively having beads of this kind at different locations around the core boundary are described in detail in applicant's co-pending patent application having the title "Optical Waveguide" (Ref 0079WO), filed on the same date here as. In that patent application, selective placement of beads is used to tune the characteristics of the modes that are supported by the waveguide.

FIG. 17 illustrates a small portion of an outer region of a preform stack 1700 made from circular cross section capillaries 1720. In this embodiment, the entire stack is contained in a large circular cross section capillary tube 1770, having a generally circular bore, which is large enough to receive the entire stack as a sliding fit. As shown, interstitial voids 1775 form between the edges of the stack and the internal surface of the large capillary. It has been found beneficial to pack these interstitial voids with circular cross section packing rods 1780, having various sizes selected to support all cladding capillaries in their appropriate positions within the large capillary. These rods melt and fuse with the large circular capillary to form a homogenous outer layer of glass that surrounds the microstructured inner region.

With reference to the diagram in FIG. 18, the present inventors have identified a surprising result obtained by producing a PBG fibre having a modulated arrangement of cladding node diameters, for example, as illustrated in FIG. 7*b*.

The diagram in FIG. 18 illustrates a band-gap 1800 (vertically hatched region), for a first kind of cladding region (of the kind illustrated in FIG. 6*b*), having an AFF of 0.875 and a normal arrangement of typical cladding nodes, wherein each cladding node has generally the same diameter. The band-gap is plotted on a graph with a horizontal axis, representing the nornalised propagation constant $\beta\Lambda$ (where $\Lambda$ is the cladding pitch), and a vertical axis representing normalised frequency $\omega\Lambda/c$ (where $\omega$ is the operating frequency of the light and c is the speed of light in a vacuum). The thick black line 1805, running from about $\omega\Lambda/c=12.5$ towards the upper right hand region of the diagram, is the air-light line for the cladding (where $\beta\Lambda=\omega\Lambda/c$). Light guidance in an air core running through this kind of cladding is possible for a mode that resides in a region of the graph above the air-light line and within the band-gap.

In addition, the diagram in FIG. 18 illustrates two band-gap regions 1810 and 1810' (horizontally hatched regions), for a second kind of cladding region (of the kind illustrated in FIG. 7*b*), having a modulated arrangement of cladding nodes. The larger nodes have the same diameter as the nodes in FIG. 6*b* and the smaller nodes have a diameter that is substantially the same as the thickness of the veins. The inventors have found that the two band-gap regions are, effectively, two arms of one bandgap, which, when combined, are equivalent in size to the band-gap produced by the first kind of cladding region. In other words, the effect of modulating the cladding nodes is to split a normal band-gap into two, spaced apart portions.

The present inventors have investigated this phenomenon further by varying the relative sizes of the nodes of a modulated cladding region and have discovered that, as the difference in node size decreases, the upper arm 1810 of the band-gap becomes wider (by virtue of the lower edge moving downwards) and the lower arm 1810' of the band-gap becomes thinner (by virtue of the upper edge moving downwards). The present inventors have not found this phenomenon to occur with other kinds of PBG cladding structures.

There may be particular reasons for producing PBG fibres having split bandgaps of the aforementioned kind. For example, it may be possible to manipulate the high density regions of cladding modes (or states) that typically exist on either side of a photonic band-gap region. The presence of these high density of states regions may be undesirable, since they may act as a loss route for light coupled from air-guided modes. Splitting the band-gap, by using a modulated arrangement of cladding nodes, may permit the PBG fibre maker to use the spaced apart, lower band-gap region to, effectively, force a high density of cladding modes, that would otherwise be near to the lower edge of a normal band-gap region, further away from a guided mode. In this way, since the states below the lower band-gap arm are further away from the air-guided mode, which falls inside the upper band-gap arm above the air-light line, there may be a resultant decrease in mode coupling loss. The present inventors believe there may be other advantages of producing PBG fibres having modulated cladding nodes. Work remains to be done in this area.

The fibre represented in FIG. 12*b* has the transmission loss characteristic shown in the graph in FIG. 19. The measurements were made using an optical spectrum analyser and a white light source (both from ANDO™). The measured fibre length was 300 metres, cut back to twenty metres. As shown on the graph, the fibre exhibits a transmission bandwidth of nearly 100 nm and a minimum loss of around 11 dB/km at an operating wavelength of between 1580 nm and 1590 nm. These results are an improvement over the known prior art lowest loss of 13 dB/km. In addition, it is clear from the SEM image in FIG. 12*b* that the structural homogeneity of the fibre still has room for improvement; the holes around the core defect boundary being significantly deformed compared with a perfect cladding hole arrangement, for example of the kind illustrated in FIG. 16. It is anticipated that improved fibre structures and attendant loss figures will be achieved through further experimentation.

The skilled person will appreciate that the various structures described above may be manufactured using a manufacturing process described with reference to FIGS. 10-17.

In addition, the skilled person will appreciate that while the examples provided above relate exclusively to PBG fibre cladding structures comprising triangular arrays, the present invention is in no way limited to such cladding structures.

The skilled person will appreciate that the structures described herein fit on a continuum comprising a huge number of different structures, for example having different combinations of core defect size, boundary node size, boundary vein thickness and, in general, boundary and cladding form. Clearly, it would be impractical to illustrate each and every variant of PBG waveguide structure herein. As such, the skilled person will accept that the present invention is limited in scope only by the present claims.

The invention claimed is:

1. A preform for a photonic band-gap optical fibre waveguide, comprising a stack of parallel, elongate primary elements and elongate secondary elements in which, in the transverse cross section, the primary elements have a largest external dimension and groups of primary elements define first interstitial regions, in at least some of which there is or are respectively one or more secondary elements having a largest external dimension which is less than one third of the size of each of the largest external dimensions of the surrounding primary elements, and
wherein the arrangement of primary and secondary elongate elements is enclosed, in the transverse cross section, by a large diameter capillary, thereby forming a plurality of outer interstitial regions between an inner periphery of the large diameter capillary and the arrangement of primary and secondary elements.

2. A preform according to claim 1, wherein at least some of the first interstitial regions are defined by groups of fewer than six primary elements.

3. A preform according to claim 1, wherein at least some of the first interstitial regions are defined by three primary elements.

4. A preform according to claim 1, wherein substantially all of the first interstitial regions are defined by three primary elements.

5. A preform according to claim 1, wherein at least some of the first interstitial regions are enclosed by abutting primary elements.

6. A preform according to claim 1, wherein substantially all of the first interstitial regions are enclosed by abutting primary elements.

7. A preform according to claim 1, wherein each primary element that defines one of the first interstitial regions abuts at least one of the one or more secondary elements that is (or are) in that region.

8. A preform according to claim 1, wherein at least some of the first interstitial regions contain plural secondary elements.

9. A preform according to claim 1, wherein at least some of the secondary elements are capillaries.

10. A preform according to claim 1, wherein at least some of the secondary elements are rods.

11. A preform according to claim 1, wherein at least some of the primary elements are capillaries.

12. A preform according to claim 1, wherein at least some of the primary elements have a circular cross section.

13. A preform according to claim 1, wherein substantially all of the primary elements have the same cross sectional shape.

14. A preform according to claim 1, wherein each of the first interstitial regions containing one or more secondary elements contains substantially the same arrangement of one or more secondary elements.

15. A preform according to claim 1, wherein substantially all interstitial voids contain one or more secondary elements.

16. A preform according to claim 1, wherein the primary elements each have a similar largest external dimension.

17. A preform according to claim 1, wherein at least a portion of the preform comprises a periodic arrangement of primary and secondary elements having a first characteristic pitch.

18. A preform according to claim 17, wherein the arrangement of primary elements has a second characteristic pitch.

19. A preform according to claim 18, wherein the arrangement of interstitial regions, containing secondary elements, has a third characteristic pitch.

20. A preform according to claim 19, wherein the second and third characteristic pitches are the same.

21. A preform according to claim 1, wherein the primary elements form a substantially triangular array.

22. A preform according to claim 1, wherein the primary elements form a substantially hexagonal array.

23. A preform according to claim 1, wherein at least some of the outer interstitial regions contain one or more secondary elements.

24. An optical fibre made from a preform as claimed in claim 1.

25. An optical fibre according to claim 24, which is a photonic band-gap optical fibre.

26. An optical fibre according to claim 25, which has a minimum loss less than 12 dB/km.

27. A method of forming a photonic band-gap fibre, comprising the steps of forming a preform according to claim 1, and heating and drawing the preform, in one or more stages, into the fibre.

28. A method according to claim 27, comprising the step of arranging primary elements to form interstitial regions and then inserting, in a longitudinal motion, the secondary elements into the interstitial regions.

29. A method according to claim 27, comprising the step of laying discrete layers of primary and secondary elements on to one another to form a stack of primary and secondary elements.

30. A method according to claim 29, comprising using automated equipment to position primary and secondary elements.

31. A preform according to claim 1, wherein, in the transverse cross section, the primary and secondary elongate elements are arranged around a further parallel elongate element, thereby forming a plurality of inner interstitial regions between an outer periphery of the further elongate element and the arrangement of first and second elongate elements.

32. A preform for a photonic band-gap optical fibre waveguide, comprising a stack of parallel, elongate primary elements and elongate secondary elements in which, in the transverse cross section, the primary elements have a largest external dimension and groups of primary elements define interstitial regions, in at least some of which there is or are respectively one or more secondary elements having a largest external dimension which is less than one third of the size of each of the largest external dimensions of the surrounding primary elements, wherein the primary elements are non-tessellating.

33. A preform for a photonic band-gap optical fibre waveguide, comprising a stack of parallel, elongate primary elements and elongate secondary elements in which, in the transverse cross section, the primary elements have a largest external dimension and groups of primary elements define interstitial regions, in at least some of which there is or are respectively one or more secondary elements having a largest external dimension which is less than one third of the size of each of the largest external dimensions of the surrounding primary elements, wherein at least a portion of the preform comprises a periodic arrangement of the primary and secondary elements having a first characteristic pitch, the arrangement of the primary elements has a second characteristic pitch; the arrangement of interstitial regions, containing the secondary elements, has a third characteristic pitch, and the third characteristic pitch is larger than the second characteristic pitch.

34. A preform according to claim 1, for a photonic band-gap optical fibre waveguide, comprising a stack of parallel, elongate primary elements and elongate secondary elements in which, in the transverse cross section, the primary elements have a largest external dimension and groups of primary elements define interstitial regions, in at least some of which there is or are respectively one or more secondary elements having a largest external dimension which is less than one third of the size of each of the largest external dimensions of the surrounding primary elements, wherein, in the transverse cross section, the primary and secondary elongate elements are arranged around a further parallel elongate element, thereby forming a plurality of second interstitial regions between an outer periphery of the further elongate element and the arrangement of first and second elongate elements.

35. A preform wherein the second interstitial regions remain empty.

36. A preform according to claim 34, wherein at least some of the second interstitial regions contain one or more secondary elements.

* * * * *